(12) United States Patent
Yamada

(10) Patent No.: US 9,407,782 B2
(45) Date of Patent: Aug. 2, 2016

(54) COPYING MACHINE, COPYING AREA DETECTING METHOD, AND NON-TRANSITORY COMPUTER-READABLE MEDIUM STORING INSTRUCTIONS TO EXECUTE THE METHOD

(71) Applicant: BROTHER KOGYO KABUSHIKI KAISHA, Nagoya-shi, Aichi-ken (JP)

(72) Inventor: Koji Yamada, Konan (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/716,265

(22) Filed: May 19, 2015

(65) Prior Publication Data
US 2015/0341509 A1    Nov. 26, 2015

(30) Foreign Application Priority Data
May 20, 2014    (JP) .................................. 2014-104269

(51) Int. Cl.
*H04N 1/04*    (2006.01)
*H04N 1/00*    (2006.01)

(52) U.S. Cl.
CPC ......... *H04N 1/0066* (2013.01); *H04N 1/00681* (2013.01)

(58) Field of Classification Search
CPC .................. H04N 1/00795; H04N 2201/0081; H04N 2201/0094; H04N 1/00708; H04N 1/00713; H04N 1/00737; H04N 1/0071; H04N 1/00745; H04N 1/00758; H04N 5/23212; H04N 1/00588; H04N 1/00591; H04N 1/00721

USPC .......... 358/1.9, 474, 498, 448, 449, 453, 462, 358/488, 505; 382/141, 190, 100, 103, 112, 382/118, 128, 132, 133, 218, 224, 226; 399/328

See application file for complete search history.

(56) References Cited

U.S. PATENT DOCUMENTS

| | | | | |
|---|---|---|---|---|
| 4,378,375 A | * | 3/1983 | Kunimatsu | ................. C12J 1/00 426/17 |
| 4,656,140 A | * | 4/1987 | Yamada | ............... G01N 1/2247 423/245.1 |
| 5,719,968 A | * | 2/1998 | Hashimoto et al. | ........... 382/288 |
| 6,081,687 A | * | 6/2000 | Munemori et al. | ........... 399/374 |

(Continued)

FOREIGN PATENT DOCUMENTS

| | | |
|---|---|---|
| JP | 2001-282049 A | 10/2001 |
| JP | 2006-101476 A | 4/2006 |

(Continued)

*Primary Examiner* — Negussie Worku
(74) *Attorney, Agent, or Firm* — Merchant & Gould P.C.

(57) ABSTRACT

A copying machine changes a reading position to a first position corresponding to the designated sheet size without executing reading, obtains first line data corresponding to a length of a longer side of the designated sheet size by causing the reading mechanism to read one line of image along the main scanning direction when the reading position is the first position, determines the target reading area on the original sheet placement table with use of the main length of the original sheet and the designated sheet size when the main length of the original sheet is identifiable with use of the first line data, the target reading area having a rectangular shape, one of vertexes of the rectangular shape being the basic point, and generates read data representing a read image within the target reading area by causing the reading mechanism to read the target reading area.

13 Claims, 13 Drawing Sheets

(56) References Cited

U.S. PATENT DOCUMENTS

| | | | |
|---|---|---|---|
| 7,408,685 B2* | 8/2008 | Noguchi et al. | 358/487 |
| 7,639,408 B2* | 12/2009 | Matsumoto | 358/474 |
| 8,661,047 B2* | 2/2014 | Talwar et al. | 707/757 |
| 2004/0064746 A1* | 4/2004 | Nishimoto | G06F 9/4403 |
| | | | 713/323 |
| 2006/0028696 A1 | 2/2006 | Michiie et al. | |
| 2007/0041057 A1* | 2/2007 | Chen | 358/474 |
| 2009/0237751 A1* | 9/2009 | Ishido | 358/483 |
| 2009/0268264 A1* | 10/2009 | Minamino | H04N 1/3878 |
| | | | 358/474 |
| 2009/0273818 A1* | 11/2009 | Matsui | 358/488 |
| 2009/0323135 A1* | 12/2009 | Shinkawa | 358/474 |
| 2010/0073694 A1 | 3/2010 | Fujiwara | |
| 2010/0095294 A1* | 4/2010 | Yamada | G06F 8/61 |
| | | | 717/174 |
| 2010/0315689 A1* | 12/2010 | Hayakawa | H04N 1/00681 |
| | | | 358/474 |
| 2010/0328729 A1* | 12/2010 | Hirao et al. | 358/449 |
| 2011/0242590 A1* | 10/2011 | Takahashi | G06F 21/6209 |
| | | | 358/1.15 |
| 2011/0299131 A1* | 12/2011 | Murata et al. | 358/448 |
| 2013/0242355 A1* | 9/2013 | Morita et al. | 358/449 |
| 2013/0321833 A1* | 12/2013 | Yabuuchi | H04N 1/00278 |
| | | | 358/1.13 |
| 2014/0043664 A1* | 2/2014 | Sunada | 358/498 |
| 2015/0046451 A1* | 2/2015 | Yamada | G06F 9/44505 |
| | | | 707/736 |

FOREIGN PATENT DOCUMENTS

| | | |
|---|---|---|
| JP | 2010-74753 A | 4/2010 |
| JP | 2013-211658 A | 10/2013 |

* cited by examiner

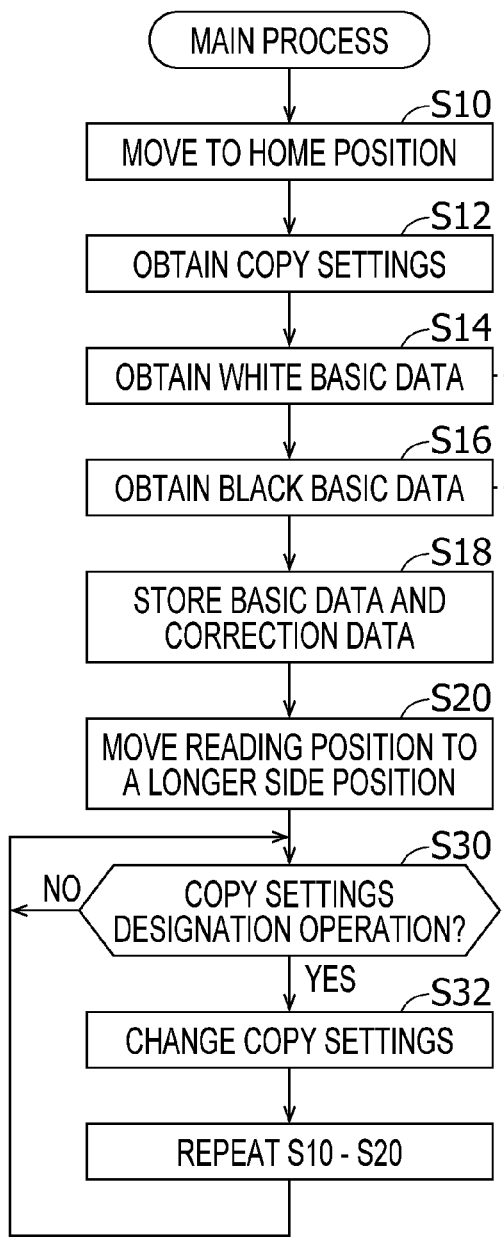
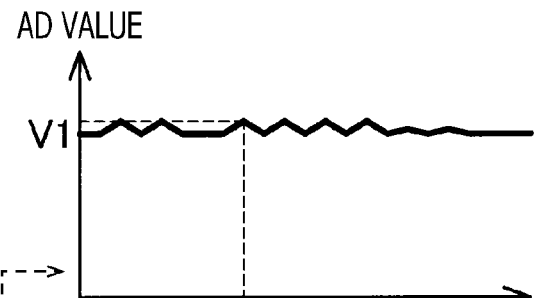
FIG. 2A
FIG. 2B
FIG. 2C

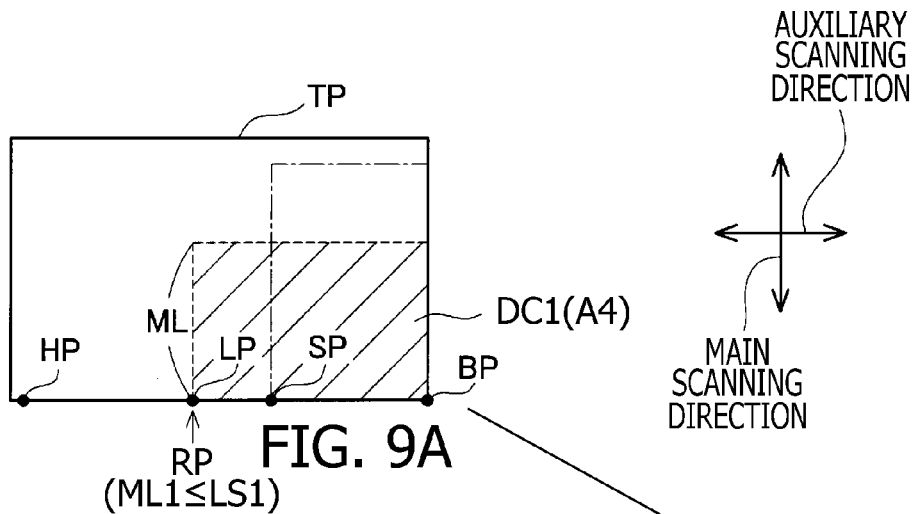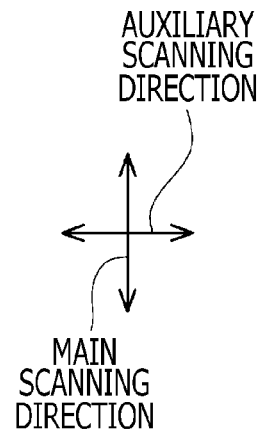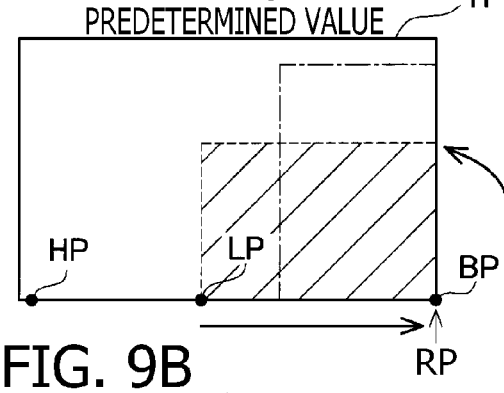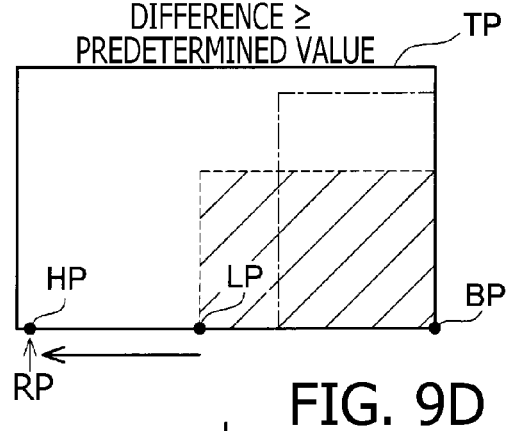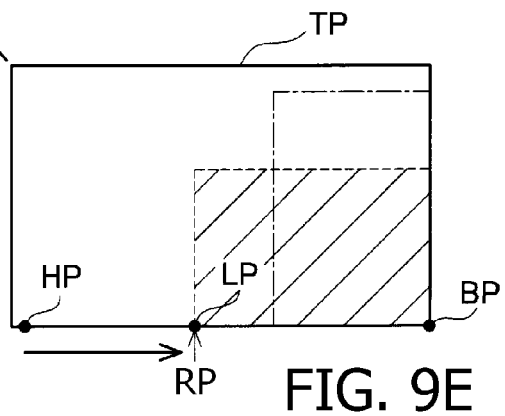

(CASE X2) DESIGNATED SHEET SIZE: A4 (LL1 x LS1)
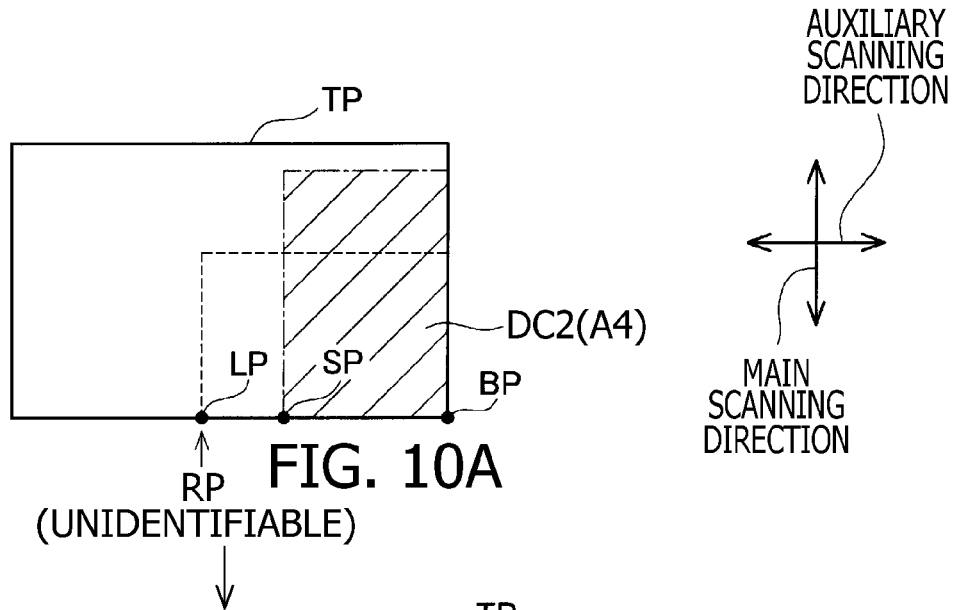
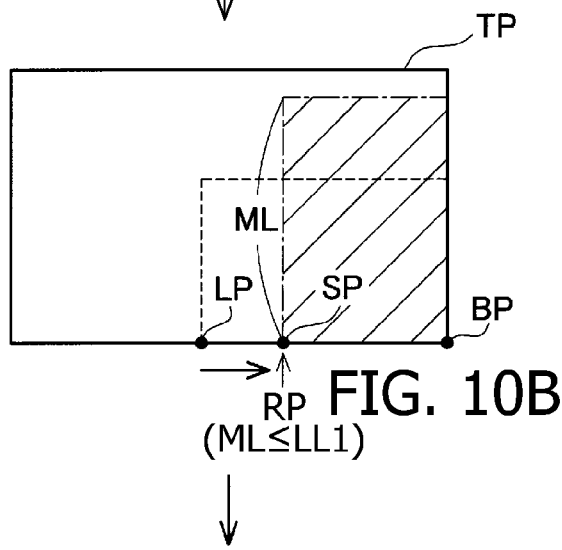
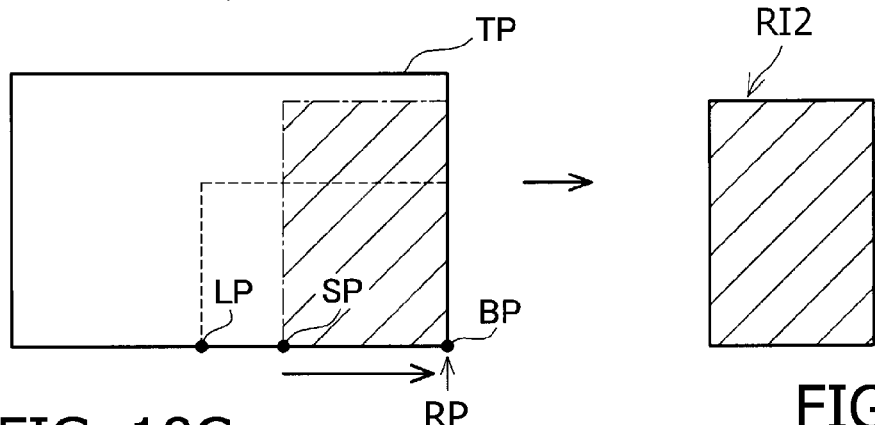 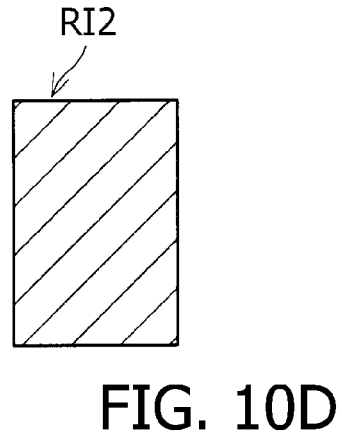

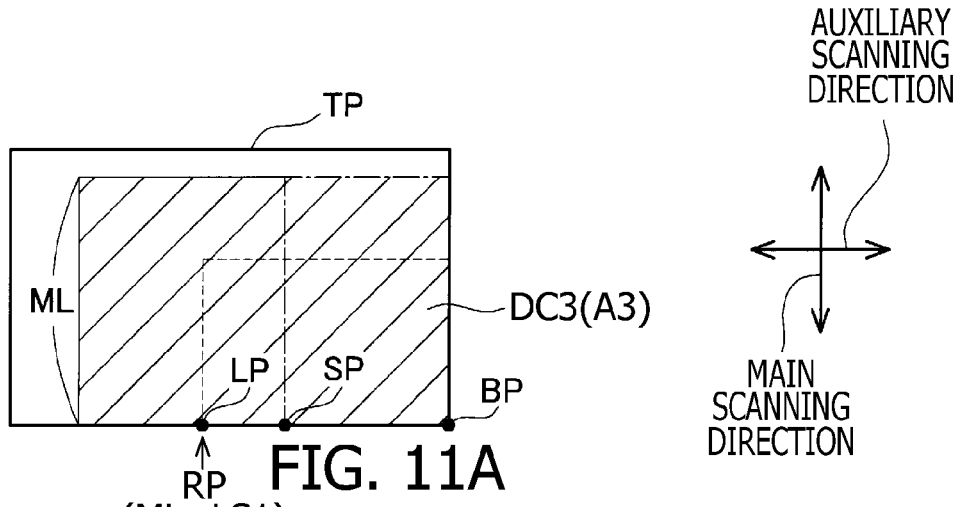
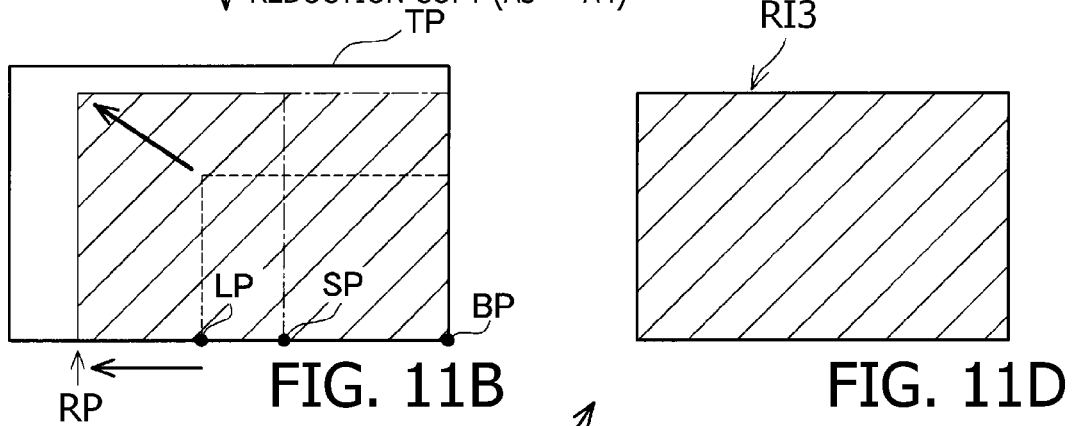
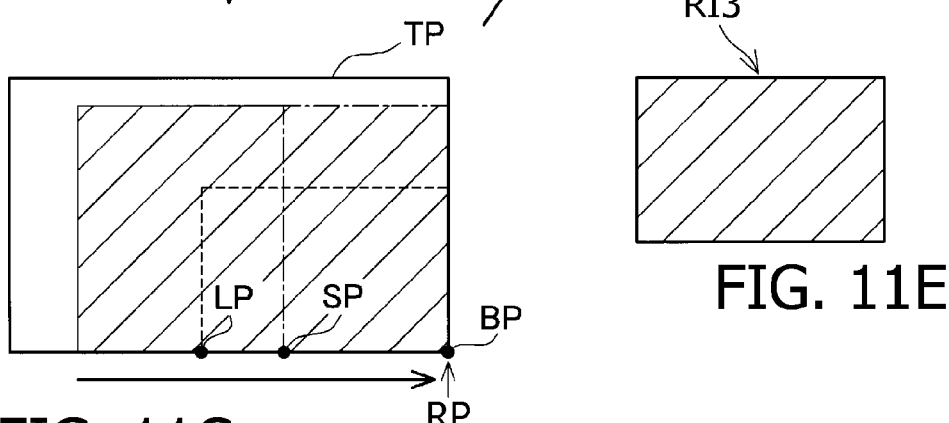
FIG. 11A, FIG. 11B, FIG. 11C, FIG. 11D, FIG. 11E (CASE Y2) DESIGNATED SHEET SIZE: B5 (LL2 x LS2)
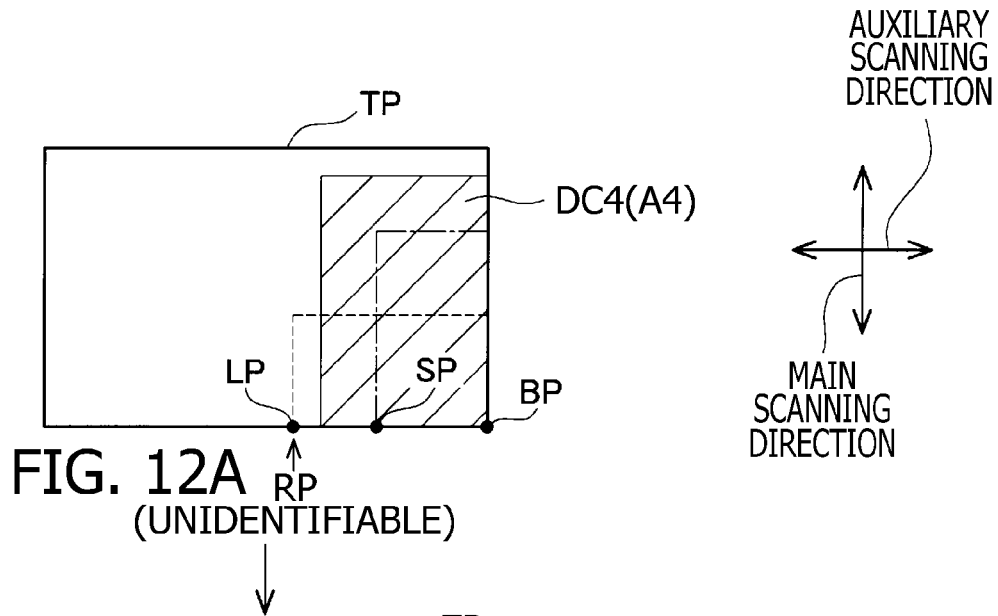
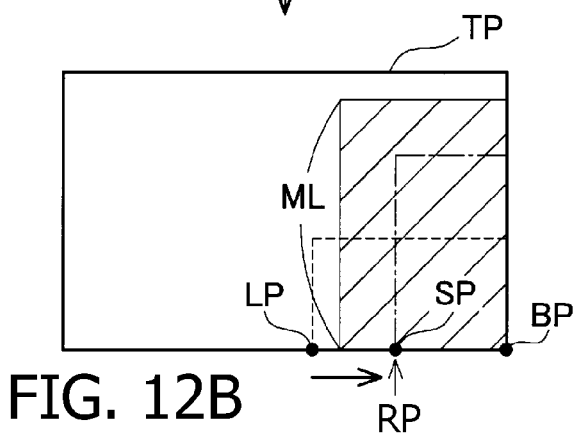
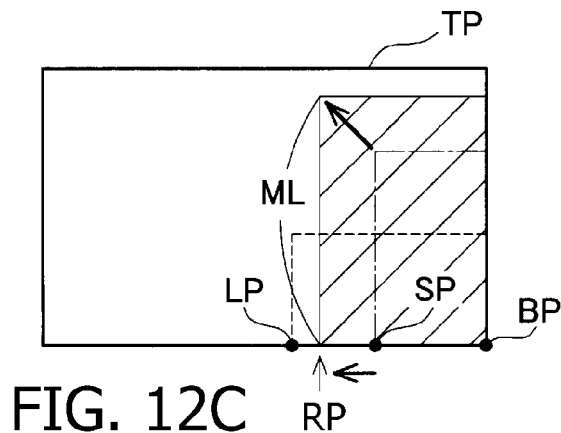

(CASE Z) DESIGNATED SHEET SIZE: A4 (LL1 × LS1)

COPYING MACHINE, COPYING AREA DETECTING METHOD, AND NON-TRANSITORY COMPUTER-READABLE MEDIUM STORING INSTRUCTIONS TO EXECUTE THE METHOD

CROSS-REFERENCE TO RELATED APPLICATION

This application claims priority under 35 U.S.C. §119 from Japanese Patent Application No. 2014-104269 filed on May 20, 2014. The entire subject matter of the application is incorporated herein by reference.

BACKGROUND

1. Technical Field

The present disclosures relate to a copying machine configured to print an image on a printing sheet based on a result of reading an image on an original sheet. The disclosures also relate to a method of detecting a copying area, and a non-transitory computer-readable medium containing instructions which cause a computer to execute the method.

2. Related Art

There has been known an image scanner provided with a reading mechanism employing a CCD (charge coupled device) elements and an original sheet size detecting sensor. Typically, such a scanner is configured to determine size and orientation of the original sheet based on a combination of an assumed size of the original sheet in a main scanning direction based on output of the CCD elements, and an assumed size of the original sheet in an auxiliary scanning direction based on an output of the original sheet size detecting sensor.

SUMMARY

According to a conventional technique employed, for example, in the above-described conventional scanner, in order to determine a target reading area of the original sheet subject to be scanned, the original size detecting sensor is required besides the reading mechanism. According to aspect to the disclosures, there is provided a technique in which it is unnecessary to have the original size detecting sensor besides the reading mechanism.

According to aspects of the disclosures, there is provided a copying machine which has an original sheet placement table on which a basic point is defined, one of vertexes of an original sheet subject to reading being to be arranged at the basic point, a reading mechanism configured to read an image on the original sheet placed on the original sheet placement table, the reading mechanism reading the image on a line basis, the line extending in a main scanning direction by changing a reading position in an auxiliary direction which is perpendicular to the main scanning direction, a memory configured to store a designated sheet size which is one of a plurality of types of sheet sizes and designated by a user, a print mechanism configured to print an image on a printing sheet, of which size is the designated sheet size stored in the memory, based on a result of reading executed by the reading mechanism, and a controller. The controller is configured to execute a first changing process in which the controller changes the reading position to a first position which corresponds to the designated sheet size without causing the reading mechanism to execute reading, the first position being a position at which the reading position is spaced, in the auxiliary scanning direction, from the basic point by a length corresponding to a length of a longer side of the designated sheet size, a first line data obtaining process in which the controller obtains first line data corresponding to a length of a longer side of the designated sheet size by causing the reading mechanism to read one line of image along the main scanning direction when the reading position is the first position, a first determining process in which the controller determines the target reading area on the original sheet placement table with use of the main length of the original sheet and the designated sheet size when the main length of the original sheet is identifiable with use of the first line data, the target reading area having a rectangular shape, one of vertexes of the rectangular shape being the basic point, and a read data generating process in which the controller generates read data representing a read image within the target reading area of an original image formed on the original sheet by causing the reading mechanism to read the image within the target reading area.

According to the above configuration, when the main length of the original sheet can be identified with use of the first line data which is reading result of one line of image at the first position corresponding to the designated sheet size, the controller determines the target reading area based on the main length and the designated sheet size. That is the copying machine can appropriately determine the target reading area even if a sensor different from the reading mechanism is not provided.

It is noted that aspects of the disclosures also include a computer-readable medium storing instructions to be executed by the controller of the copying machine above, and a method executed by the copying machine configured above.

BRIEF DESCRIPTION OF THE ACCOMPANYING DRAWINGS

FIG. 2A is a flowchart illustrating a main process of the copying machine according to an embodiment of the disclosures.

FIG. 2B is a graph illustrating a relationship between an AD value and a position of the reading unit in a main scanning direction when white reference data is obtained.

FIG. 2C is a graph illustrating a relationship between an AD value and a position of the reading unit in the main scanning direction when black reference data is obtained.

FIGS. 9A-9E show a case X1 in which a designated sheet size is A4 and an A4 size original sheet is placed on the transparent plate in a landscape orientation.

FIGS. 10A-10D show a case X2 in which a designated sheet size is A4 and an A4 size original sheet is placed on the transparent plate in a portrait orientation.

FIGS. 11A-11E show a case Y1 in which a designated sheet size is A4 and an A3 size original sheet is placed on the transparent plate in a landscape orientation.

FIGS. 12A-12C show a case Y2 in which a designated sheet size is B5 and an A4 size original sheet is placed on the transparent plate in a portrait orientation.

DETAILED DESCRIPTION OF THE EMBODIMENTS

<Configuration of Copying Machine>

Figure 1A:
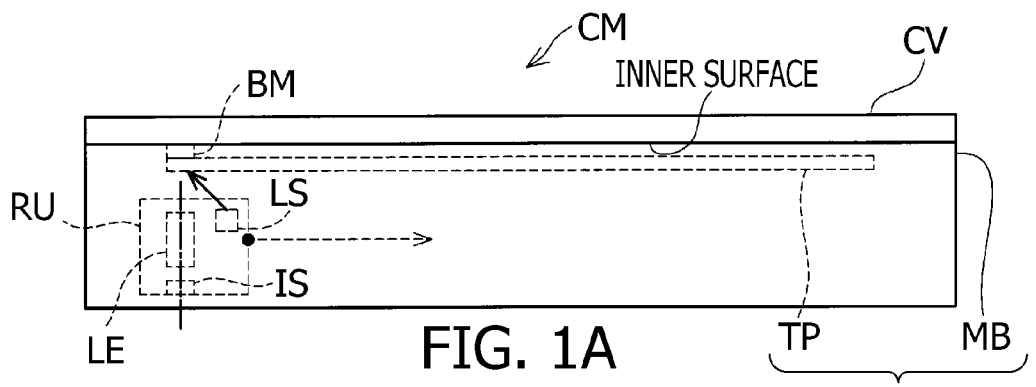
FIG. 1A is a front view of a copying machine according to an embodiment of the disclosures.

FIG. 1A is a front view of a copying machine CM according to an embodiment of the disclosures. The copying machine CM has a document table DT and a cover CV. The document table DT has a main body MB and a transparent plate TP. The main body MB is a housing accommodating various components (e.g., the transparent plate TP, a reading unit RU, and the like) of the copying machine CM. The transparent plate TP is accommodated in the main body MB and fixed thereto. An original sheet subject to reading is to be placed on the transparent plate TP. The cover CV is arranged above the main body MB, and is configured to be opened/closed with respect to the main body MB. An inner surface (i.e., a surface on a transparent plate TP side) of the cover CV is formed to be a black surface.

The copying machine CM has the reading unit RU which is accommodated in the main body MB and arranged below the transparent plate TP. The reading unit RU is configured to be moved, with respect to the main body MB, in a right-left direction in FIG. 1A, which direction will be referred to as an auxiliary scanning direction. The reading unit RU executes reading of the original sheet placed on the transparent plate TP. The reading unit RU has a light source LS, a lens LE and an image sensor IS. The light source LS is configured to emit light toward the transparent plate TP. The lens LE is configured to receive light, which is emitted by the light source LS and reflected by the original sheet, and converge the received light on the image sensor IS. According to the embodiment, the image sensor IS is a CIS (contact image sensor) and receives the light converged by the lens LE. According to the embodiment, the image sensor IS has a plurality of photosensitive elements which are arranged in a direction perpendicular to a plane of FIG. 1A (which direction will be referred to as a main scanning direction). That is, the image sensor IS according to the embodiment is a line sensor, which executes reading of an image on a line basis with use of the plurality of photosensitive elements arranged in the main scanning direction. In the following description, a position, in the auxiliary scanning direction, of the image sensor IS will be referred to as a reading position.

Figure 1B:
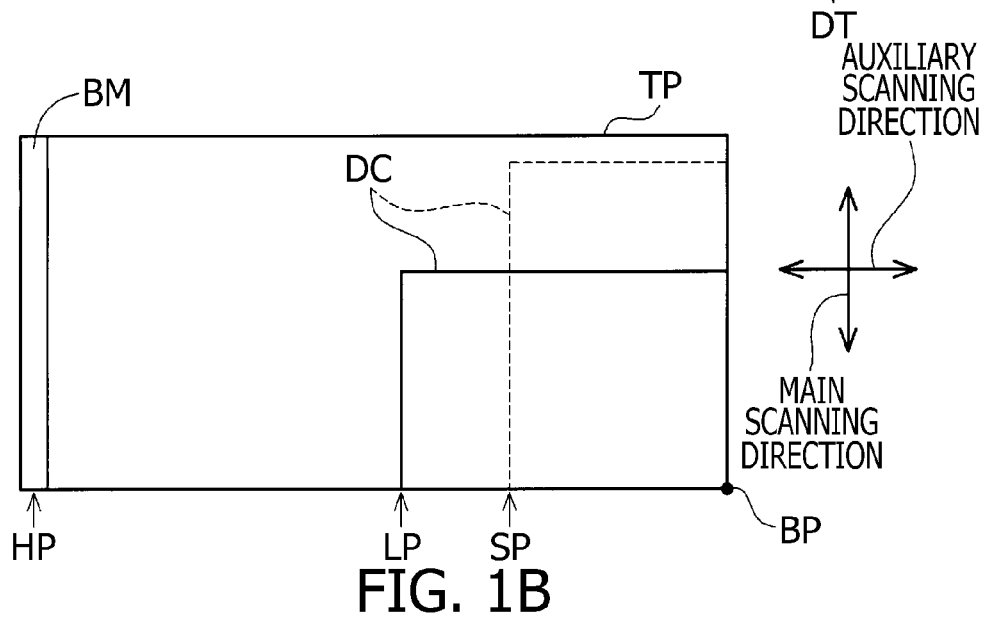
FIG. 1B is a plan view of a transparent plate provided inside the copying machine shown in FIG. 1.

FIG. 1B shows a plan view of the transparent plate TP. The transparent plate TP has a rectangular shape of which shorter sides extend in the main scanning direction and longer sides extend in the auxiliary scanning direction. At one corner of the transparent plate TP, a basic point BP, at which one of vertexes of the original sheet DC is to be positioned, is defined. According to the embodiment, a lower right corner of the transparent plate TP in FIG. 1B is defined as the basic point BP, and the original sheet DC is to be placed on the transparent plate TP such that the lower right vertex thereof is position at the basic point BP. On the transparent plate TP, the original sheet DC is placed in the landscape orientation or in the portrait orientation. It is noted that when the original sheet DC is placed in the landscape orientation, a shorter side of the original sheet DC extends along a shorter side of the transparent plate TP, while, when the original sheet DC is placed in the portrait orientation, a longer side of the original sheet DC extends along the shorter side of the transparent plate TP. According to the embodiment, the transparent plate TP is configured to have a size such that an A3-size original sheet can be placed on the transparent plate TP in the landscape orientation.

The copying machine CM further has a white basic member BM, which is fixed on the upper surface of the transparent plate TP. The white basic member BM is arranged at an end portion (on the left-had side end portion in FIG. 1B) of the transparent plate TP in the main scanning direction. The white basic member BM is a white member extending in the main scanning direction and is used when white basic data is obtained. In the following description, a position, in an auxiliary scanning direction, at which the white basic member BM is secured will be referred to as a "home position" HP.

Figure 1C:
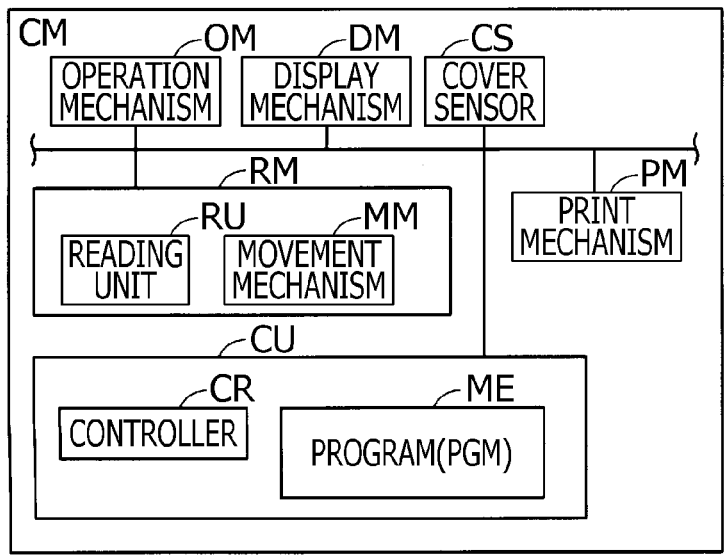
FIG. 1C is a block diagram of the copying machine according to the embodiment of the disclosures.

FIG. 1C shows a configuration of the copying machine CM. The copying machine CM is provided with an operation mechanism OM, a display mechanism DM, a cover sensor CS, a reading unit RU, a print mechanism PM, and a control unit CU. The operation mechanism OM has a plurality of keys to be operated by a user. That is, the user can input various instructions in the copying machine CM by operating the operation mechanism OM. The display mechanism DM has a display on which various pieces of information will be displayed. The cover sensor CS outputs a cover state signal representing whether the cover CV is opened or closed with respect to the main body MB, which cover state signal will be supplied to the control unit CU.

The reading mechanism RM includes a reading unit RU and a movement mechanism MM, the movement mechanism MM is configured to move the reading unit RU in the auxiliary scanning direction. The print mechanism PM is print an image on a printing sheet based on a result of reading by the reading mechanism RM in accordance with an inkjet printing method, or an electrophotographic image forming method. The control unit CU has a controller CR and a memory ME. The controller CR is a processor which is configured to execute various processes (e.g., processes as shown in FIGS. 2A-8) based on programs PGM stored in the memory ME.

Next, a main process executed by the controller CR will be described with reference to a flowchart shown in FIG. 2A, and graphs shown in FIGS. 2B and 2C. The controller CR starts the main process shown in FIG. 2A when the copying machine CM is powered on.

In S10, the controller CR controls the movement mechanism MM to move the reading unit RU, without causing the reading unit RU to execute reading, to change the reading position from a position when the copying machine CM is powered off to the home position HP. With this control, the reading position of the reading unit RU, that is, a location of the image sensor IS coincides with the position of the white basic member BM in the auxiliary scanning direction.

In S12, the controller CR obtains copy settings from the memory ME. The copy settings include a sheet size and a reading resolution. The sheet size represents a size of the printing sheet on which an image obtained by reading the original sheet is to be printed. The reading resolution represents a resolution at which the image on the original sheet is read. When the copying machine CM is powered on, the memory ME contains default settings as the copy settings. The default copy settings include a default sheet size and a default read setting and a default reading resolution, which will be read by the controller CR. According to the embodiment, the default sheet size is the A4 size (i.e., 210 mm×297 mm) and the default reading resolution is 300 dpi (dot per inch).

In S14, the controller CR obtains the white basic data. According to the embodiment, the controller CR controls the light source LS to emit light when the read position is the home position HP, and controls the reading unit RU to read one line of image. That is, the controller CR causes the reading unit RU to read the one line of image of the white basic member BM, thereby obtaining the white basic data from the reading unit RU. The white basic data represents positions of the respective photosensitive elements of the image sensor IS in the main scanning direction and AD values which are obtained by converting amplitudes of analog signals generated by respective photosensitive elements into digital values. For example, from the photosensitive element located at a position Z1 in the main scanning direction, an AD value V1 can be obtained. According to the embodiment, the AD value is larger as a target object to be read is closer to white, while the AD value is smaller as the target object is closer to black (see FIGS. 2B and 2C). It is noted that, when the process shown in FIG. 2A is executed, it is assumed that the cover CV is closed. That is, the white basic data obtained in S14 is data when the white basic member BM is read with the cover CV being closed.

In S16, the controller CR obtains the black basic data. That is, the controller CR causes the reading unit RU to read one line of image when the reading position is the home position HP without causing the light source LS to emit light. Since the cover CV is closed, the result of reading corresponds to reading of black image. Thus, the controller CR obtains the black basic data from the reading unit RU by causing the reading unit RU to ream an image with controlling the light source LS not to emit light. The black basic data represents, similarly to the white basic data, a relationship a position in the main scanning direction and the AD value. For example, from the photosensitive element located at position Z2 in the main scanning direction, an AD value V2 can be obtained. In a modified embodiment, the copying machine CM may be provided with a black reference member. In such a case, the controller CR may obtain the black basic data by causing the light source LS to emit light and causing the reading unit RU to read an image of the black reference member.

In S18, the controller CR stores the white basic data obtained in S14 and the black basic data obtained in S16 in the memory ME. Further, the controller CR generates compensation data used for a shading correction with use of the white basic data, black basic data and the scanning resolution obtained in S12, and stores the compensation data in the memory ME.

In S20, the controller CR controls the movement mechanism MM to move the reading unit RU such that the reading position is changed from the home position HP to a longer side position with controlling the reading unit not to read an image. According to the embodiment, the controller CR identifies the longer side position as follows. The memory ME stores lengths of longer side and shorter side of each of a plurality of sheet sizes (e.g., A3, A4, B4, B5, etc.). Firstly, the controller CR identifies a length of the longer side of the sheet size (e.g., A4) obtained in S12 from among the lengths stored in the memory ME. Then, the controller CR identifies a position which is spaced from the basic point BR in the auxiliary scanning direction by an amount corresponding to the length of the longer side as the longer side position. It is noted that, according to the embodiment, a term "corresponding to the length of the longer side" means that the length is actually slightly shorter than the longer side (e.g., shorter by 3 mm). According to such a configuration, when the original sheet having the designated sheet size is placed on the transparent plate TP in the landscape orientation, a possibility that the original sheet is located at the longer side position can be made higher. According to such a configuration, the controller CR can identify the length of the original sheet in the main scanning direction appropriately in a step S60 or S70 (FIG. 3) which will be described in detail later. It is noted that in a modified embodiment, the term "corresponding to the length of the longer side" may mean that the length is equal to the length of the longer side.

In S30, the controller CR checks whether a user operation of a copy setting (hereinafter, referred to as a copy setting operation) is performed with use of the operation mechanism OM. The copy setting instruction operation includes an operation to designate one sheet size from among the plurality of kinds of sheet sizes, and an operation to select one reading resolution from among a plurality of kinds of reading resolutions (e.g., 300 dpi, 600 dpi, 1200 dpi, etc.). In the following description, the sheet size and the reading resolution designated by the copy setting instruction operation will be referred to as a designated sheet size and a designated reading resolution, respectively. When the copy setting instruction operation is executed, the controller CR determines that a judgment in S30 is "YES" and proceeds to S32.

In S32, the controller CR stores the new copying settings including the designated sheet size and the designated reading resolution instead of the current copy settings (e.g., default sheet size, default reading resolution, etc.) in the memory ME.

Next, the controller CR repeats steps S10-S20. As a result, for example, in S12, the controller CR obtains the new copy settings (which include the designated sheet size and the designated reading resolution) stored in the memory ME, and in S18, new compensation data is generated bases on the designated reading resolution, and in S20, the reading position is changed to a new longer side position corresponding to the designated sheet size.

Next, the controller CR returns to S30, and checks whether the copy setting operation is performed by the user. In other words, the controller CR executes steps S10-S20 every time when the copy setting operation is executed, or the copy settings in the memory ME have been changed.

Next, referring to FIG. 3, a copying process executed by the controller CR will be described. The controller CR starts the copying process (FIG. 3) in response to receipt of a user instruction to execute copying through the operation mechanism after the target original sheet is placed on the transparent plate TP.

In S50, the controller CR obtains the copy settings from the memory ME. For example, if S32 has been executed before S50, the controller CR obtains the designated sheet size and the designated reading resolution from the memory ME.

In S52, the controller CR determines whether the cover CV is opened with respect to the main body MB. That is, the decision in S52 is "YES" when the cover state signal obtained from the cover sensor CS (see FIG. 1C) represents that the cover CV is opened, and proceeds to S60. Otherwise, when the cover state signal represents that the cover CV is closed, the decision in S52 is "NO" and the controller CR proceeds to S70.

In S60, the controller CR executes an open time detection process, which is a process of detecting a length of the original sheet in the main scanning direction under a state where the cover CV is opened. In S70, the controller CR executes a close time detection process, which is a process of detecting a length of the original sheet in the main scanning direction under a state where the cover CV is closed. The controller CR proceeds to S100 after execution of S60 or S70.

In S100, the controller CR executes a target reading area determining process with use of a detection result in S60 or S70. The target reading area is an area within the transparent plate TP (i.e., within the original sheet placement table DT), and an image within the target reading area is read. In S200, the controller CR executes the copying process (see FIG. 8) based on the target reading area determined in S100. After execution of S200, the copying process shown in FIG. 3 is terminated.

Next, referring to FIG. 4A, the open time detection process (see S60 of FIG. 3) will be described. In S62, the controller CR obtains light-emitting time line data. That is, the controller CR causes the light source LS to emit light, and causes the reading unit RU to read one line of image. With this operation, the controller CR obtains the light-emitting time line data which is a reading result of one line of image from the reading unit RU.

In S64, the controller CR obtains non-emission line data. That is, the controller CR controls the light source LS not to emit light and causes the reading unit RU to read one line of image. With this operation, the controller CR obtains a non-emission line data which is a reading result of one line of image from the reading unit RU.

In S66, the controller CR executes a main length determining process. It is noted that the "main length" means a length of the original sheet in the main scanning direction. According to the embodiment, the controller CR generates difference data based on the light-emitting time line data obtained in S62 and the non-emission line data obtained in S64, and determines the main length of the original sheet based on the difference data.

Figure 4A:
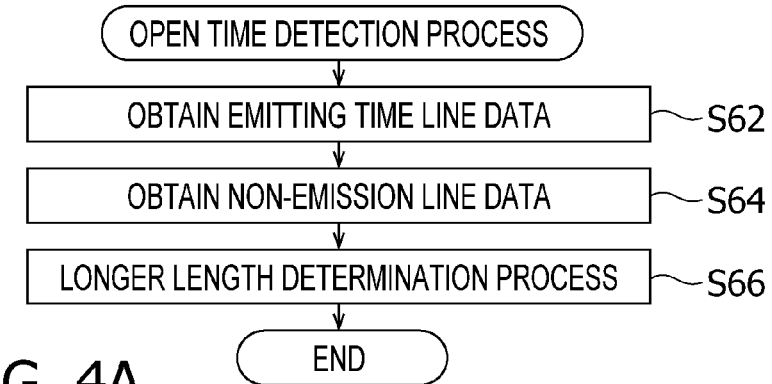
FIG. 4A is a flowchart illustrating an open-time detection process.
Figure 4B:
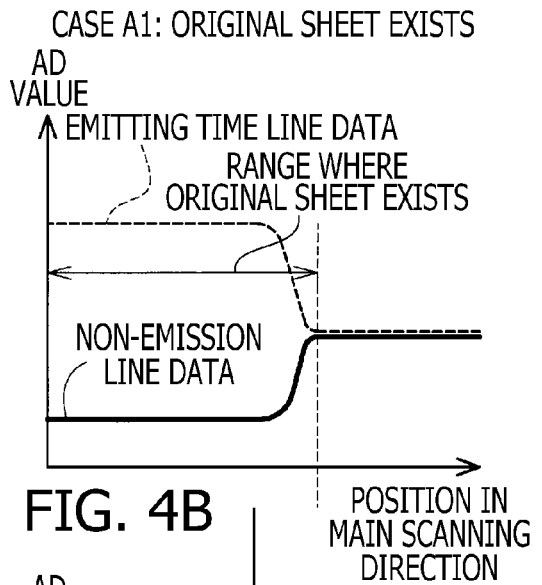
FIGS. 4B and 4C are graphs showing a relationship between the AD value and the position of the reading unit in the main scanning direction when an original sheet exists.
Figure 4D:
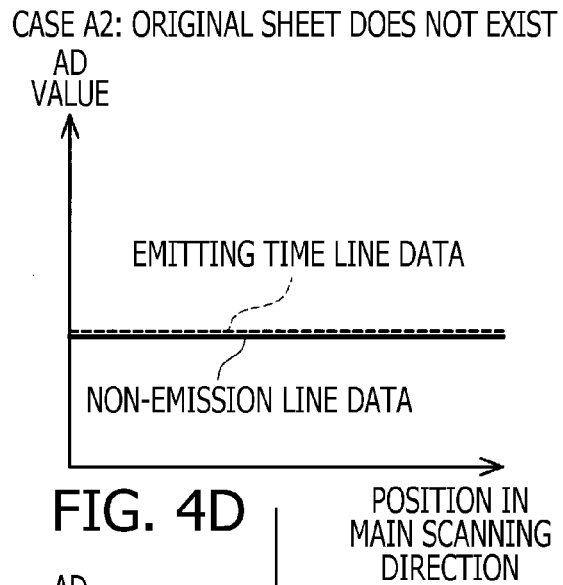
FIGS. 4D and 4E are graphs showing a relationship between the AD value and the position of the reading unit in the main scanning direction when no original sheet exits.
Figure 4C:
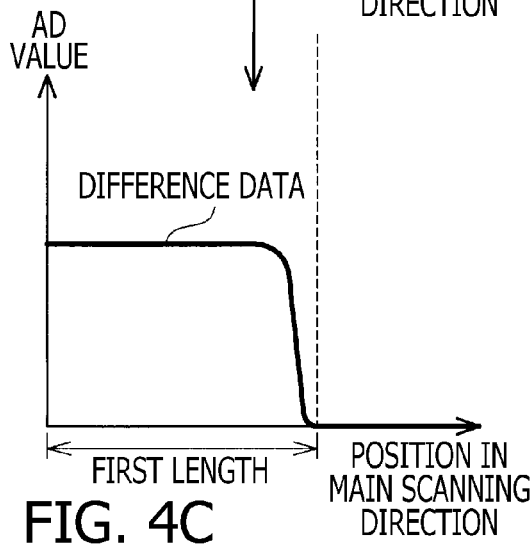
Figure 4E:
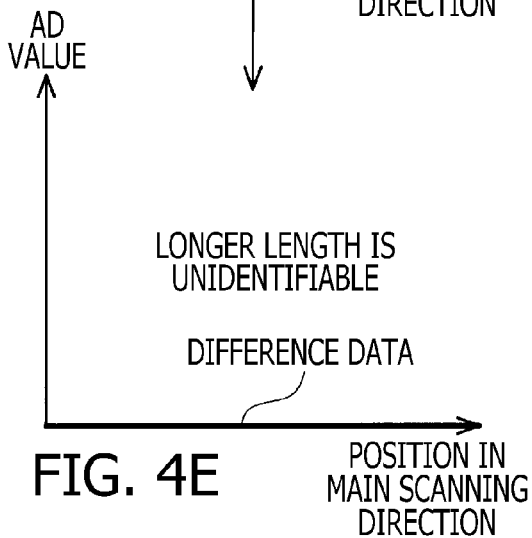

FIGS. 4B and 4C show case A1, in which an original sheet having a white background exists at the reading position. In this case, the light-emitting time line data (indicated by broken lines) exhibits relatively large AD values at positions where the original sheet exists, while relative small AD values at positions where the original sheet does not exist. On the other hand, the non-emission line data (indicated by solid line) exhibits relatively small AD values at positions where the original sheet exists, while relatively large AD values at positions where the original sheet does not exist. It is noted that the AD values represented by the light-emitting time line data and the non-emission line data are the same at positions where the original sheet does not exist.

In S66, the controller CR generates the difference data by calculating the difference between the AD values represented by the light-emitting time line data and the AD values of the non-emission line data at each main scanning position. Then, the controller CR identifies the length of a portion representing the difference greater than zero as the main length of the original sheet. As described above, according to the embodiment, the copying machine CM is capable of appropriately determine the main length of the original sheet with use of the light-emitting time line data and the non-emission line data.

On the other hand, as shown in case A2, when the original sheet does not exist at the reading position, generally, the AD value of the light-emitting time line data and the AD value of the non-emission time line data equal to each other at each position along the main scanning direction. Accordingly, the difference at each position in the main scanning direction is zero, and the controller CR is unable to determine the main length of the original sheet.

Figure 5A:
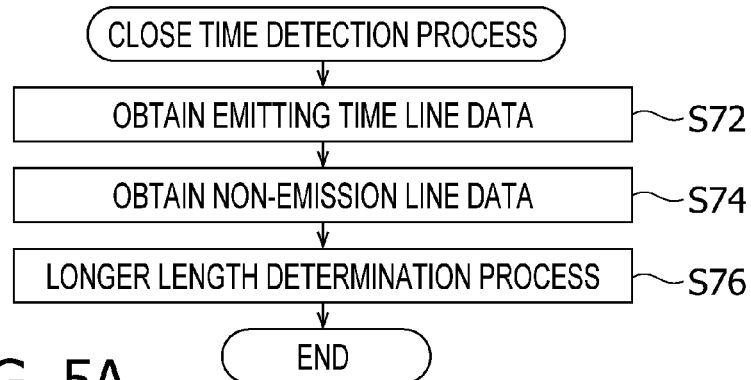
FIG. 5A is a flowchart illustrating a closed-time detection process.

Next, referring to FIG. 5A, the close time detection process, which is called in S70 of FIG. 3, will be described. It is noted that steps S72-S76 are the same as S62-S66 of the open time detection process shown in FIG. 4A. That is, the controller CR obtains the light-emitting time line data in S72 and non-emission line data in S74, and executes the main length determination process in S76.

Figure 5B:
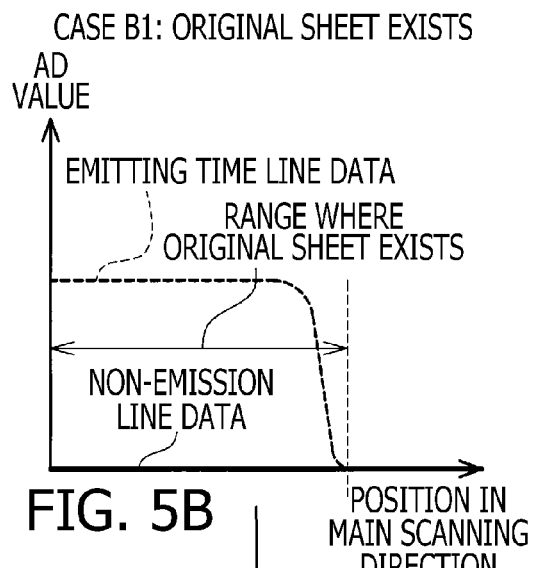
FIGS. 5B and 5C are graphs showing a relationship between the AD value and the position of the reading unit in the main scanning direction when an original sheet exists.
Figure 5D:
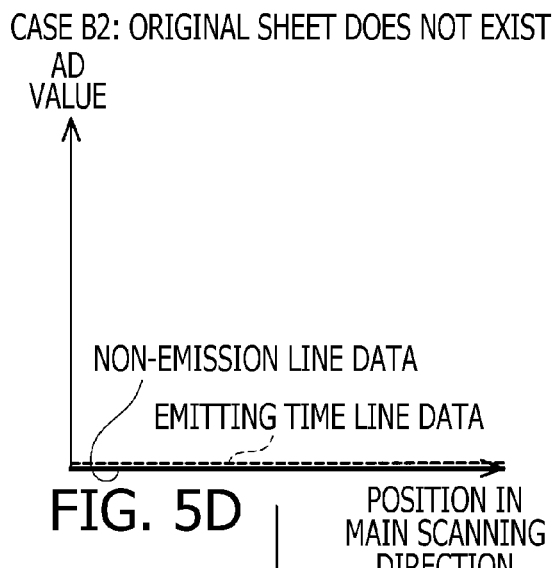
FIGS. 5D and 5E are graphs showing a relationship between the AD value and the position of the reading unit in the main scanning direction when no original sheet exits.
Figure 5C:
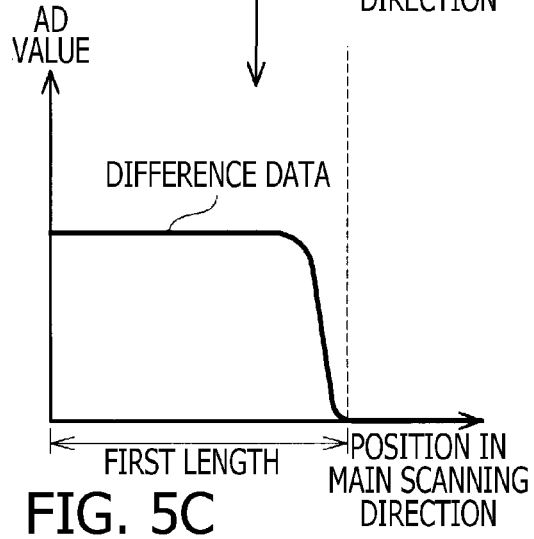
Figure 5E:
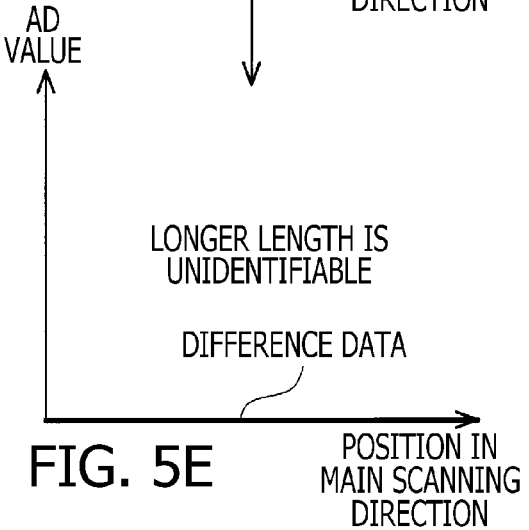

FIG. 5B shows case B1 in which it is assumed that the original sheet having a white background is located at the reading position. In case B1, the light-emitting time line data (represented by broken lines) exhibit relatively large AD values, while the non-emission line data (represented by solid line) exhibit relatively small AD values. In particular, since the cover CV is closed and the inner side of the cover CV is black, the AD value at a portion where the original sheet does not exist is zero which is a normal value corresponding to black. Further, the non-emitting line data (represented by solid line) normally exhibits the AD value of zero regardless of positions in the main scanning direction where the original sheet may exit or not.

When the original sheet does not exist at the reading position as in case B2 (see FIG. 5D), either the light-emitting time line data or the non-emission line data exhibits the AD value of zero which corresponds to the normal AD value for black. In this case, regardless of the positions in the main scanning direction the difference between the light-emitting time line data and the non-emission line data represents zero, and the controller CR cannot identify the main scanning length of the original sheet.

Figure 6:
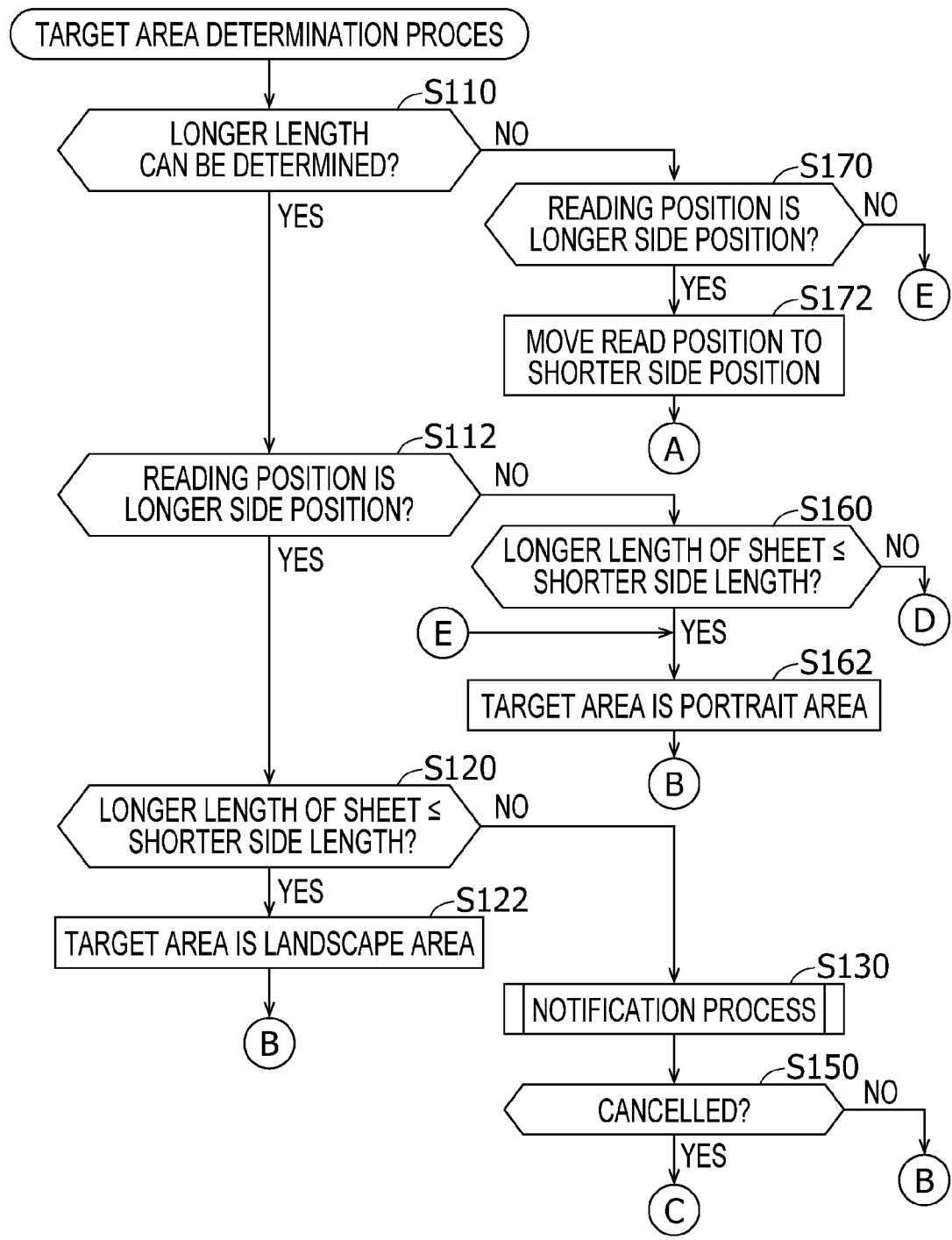
FIG. 6 is a flowchart illustrating a target reading area determining process according to the embodiment of the disclosures.

Next, referring to FIG. 6, the target reading area determination process which is called in S100 of FIG. 3 will be described. In S110, the controller CR determines whether the main length of the original sheet has been identified in latest S60 or S70 (FIGS. 4 and 5). When it is determined that the main length of the original has been identified (S110: YES), the controller CR proceeds to S112. When it determined that the main length of the original sheet has not been identified (S110: NO), the controller CR proceeds to S170. In the following description, the main length identified in latest S60 or S70 will be referred to as a target main length.

In S170, the controller CR determines whether the current reading position is the longer side position. When it is determined that the reading position is the longer side position (S170: YES), the controller proceeds to S172. When it is determined that the reading position is not the longer side position (i.e., when it is determined that the reading position is the shorter side position) (S170: NO), the controller CR proceeds to S162.

In S172, the controller CR controls the movement mechanism MM to move the reading unit RU, without causing the reading unit to execute reading, to move the reading position from the longer side position to the shorter side position. According to the embodiment, the controller CR identifies the shorter side position as follows. Firstly, the controller CR identifies the length of the shorter side of the designated sheet sized obtained in S50 (FIG. 3). Then, the controller CR identifies a position which is spaced from the basic point BP by the amount corresponding to the length of the shorter side having been identified as the shorter side position. It should be noted that, according to the embodiment, "corresponding to the shorter side" means that the length is slightly shorter than the actual length of the shorter side (for example, 3 mm shorter than the length of the shorter side). With this configuration, it is possible to raise a possibility that the original sheet exists at the shorter side position when it is placed in the portrait orientation. As a result, the controller CR can appropriately identify the main length of the original sheet in S60 or S70 (FIG. 3). It is noted that, according to a modified embodiment, "corresponding to the shorter side" may mean to have the same length as the shorter side. When S172 has been executed, the controller CR terminates the process shown in FIG. 6 and proceeds to S52 (FIG. 3).

In S112, the controller CR determines whether the current reading position is the longer side position. When it is determined that the current reading position is the longer side position (S112: YES), the controller CR proceeds to S120. When it is determined that the current reading position is not the longer side position (S112: NO), that is, when it is determined that the current reading position is the shorter side position as S127 has been executed, the controller CR proceeds to S160.

Figure 3:
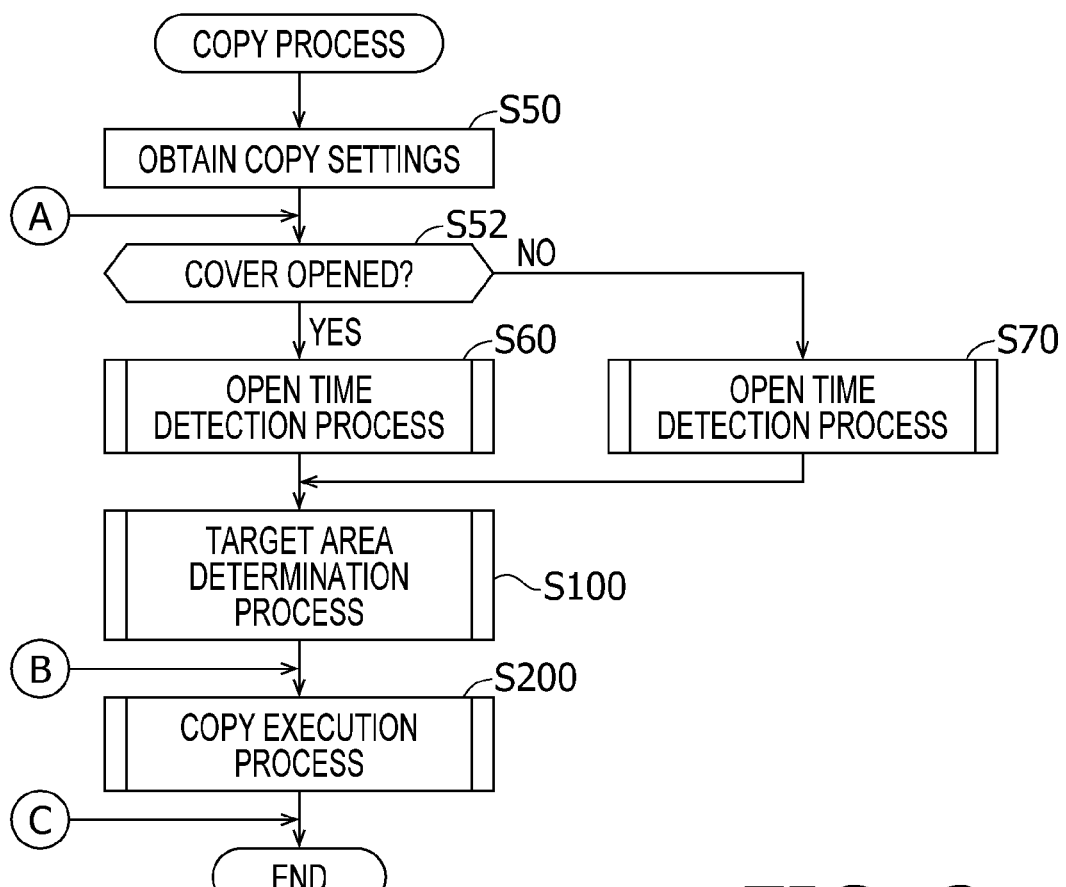
FIG. 3 is a flowchart illustrating a copying process according to an embodiment of the disclosures.

In S120, the controller CR determines whether the main length is equal to or less than the length of the shorter side of the designated sheet size which was obtained in S50 of FIG. 3. When it is determined that the main length is equal to or less than the length of the shorter side of the designated sheet size (S120: YES9, the controller CR proceeds to S122. When it is determined that the main length is longer than the length of the shorter side of the designated sheet side (S120: NO), the controller CR proceeds to S130.

In S122, the controller CR determines a landscape reading area as the target reading area within the transparent plate TP. The landscape reading area has a rectangular shape, and the basic point BP is one of vertexes of the rectangular shape. Specifically, the landscape reading area has a length, in the main scanning direction, corresponding to the shorter side of the designated sheet, and a length, in the auxiliary scanning direction, corresponding to the longer side of the designated sheet size. More specifically, according to the embodiment, the length of the landscape reading area in the main scanning direction is slightly shorter than the length of the shorter side of the designated sheet size, and the length thereof in the auxiliary scanning direction is slightly shorter than a distance between the current reading position (i.e., the longer side position) and the basic point BP, or the length of the longer side of the designated sheet size. When S122 is completed, the controller CR terminates the process shown in FIG. 6, and proceeds to S200 of FIG. 3.

Figure 7:
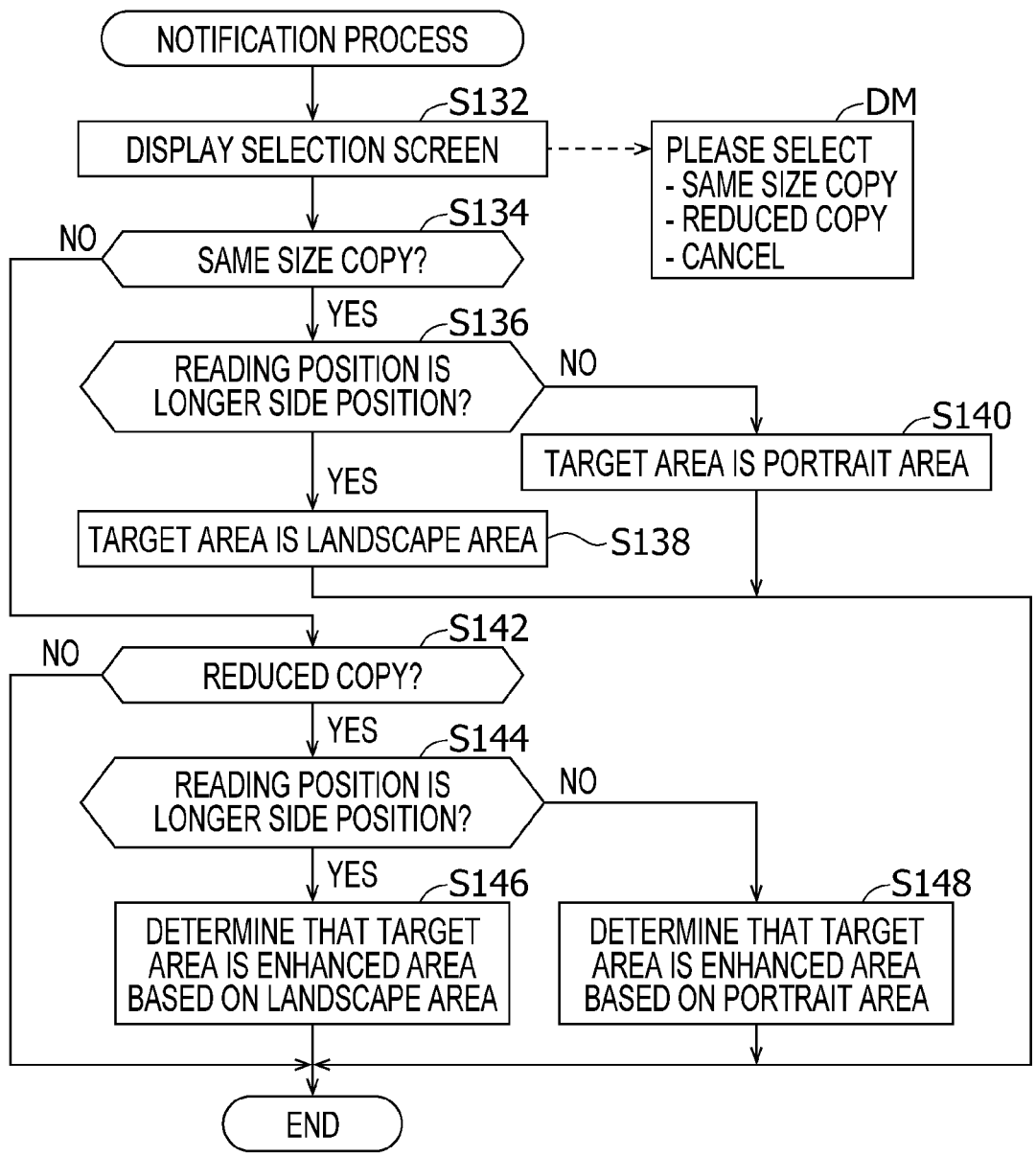
FIG. 7 is a flowchart illustrating a notifying process according to the embodiment of the disclosures.

In S130, the controller CR executes a notification process (see FIG. 7). Then, in S130, the controller CR determines whether cancellation is selected by the user in the notification process. Next, the controller CR determines whether the cancellation step is selected in the notification process. When it is determined that the cancellation has been selected (S150: YES), the controller CR terminates the process shown in FIG. 6. When it is determined that the cancellation has not been selected (S150: NO), the controller CR terminates the process shown in FIG. 6, and proceeds to S200 of FIG. 3.

In S160, the controller CR determines whether the target main length is equal to or less than the length of the longer side of the designated sheet size obtained in S50 of FIG. 3. When it is determined that the target main length is equal to or less than the length of the longer side of the designated sheet size (S160: YES), the controller CR proceeds to S162. When it is determined that the target main length is longer than the length of the longer side of the designated sheet size (S160: NO), the controller CR proceeds to S130.

In S162, the controller CR determines a portrait reading area as the target reading area within the transparent plate TP. The portrait reading area has a rectangular shape, and the basic point BP is one of vertexes of the rectangular shape. Specifically, the portrait reading area has a length, in the main scanning direction, corresponding to the longer side of the designated sheet size, and a length, in the auxiliary scanning direction, corresponding to the shorter side of the designated sheet size. More specifically, according to the embodiment, the length of the portrait reading area in the main scanning direction is slightly shorter than the length of the longer side of the designated sheet size, and the length thereof in the auxiliary scanning direction is slightly shorter than a distance between the current reading position (i.e., the shorter side position) and the basic point BP, or the length of the shorter side of the designated sheet size. When S162 is completed, the controller CR terminates the process shown in FIG. 6, and proceeds to S200 of FIG. 3.

Next, referring to the flowchart shown in FIG. 7, the notification process will be described. In S130, the controller CR causes the display mechanism DM (FIG. 1C) to display a selection screen. The selection screen is for encouraging the user to select one of "same size copy," "reduced copy" and "cancel." The same size copy is a copying operation in which read data obtained by reading an original sheet, without enlarging or reducing the read data. That is, when the same size copy is selected, the size of a sheet on which an image represented by the read data will be printed is substantially the same as the size of the target read area. The reduced copy is a copying operation in which an image represented by the read data is reduced and printed on the printing sheet. Thus, according to the reduced copy, the size of the printing sheet on which the read image is printed is smaller than the size of the target read area. When the reduced copy is selected, the user is further encouraged to select a reduction rate (e.g., one for reducing an image on A3 size sheet to an image for A4 size sheet, one for reducing an image on A4 size sheet to an image for B5 size sheet, etc.)

In S134, the controller CR determines whether the user select the same size copying. When it is determined that the same size copying is selected (S134: YES), the controller proceeds to S136, while when it is determined that the same size copying has not been selected (S134: NO), that is, when the reduced copy is selected or a selection is cancelled, the controller CR proceeds to S142.

In S136, the controller CR determines whether the current reading position is the longer side position. When it is determined that the current reading position is the longer side position (S136: YES), the controller CR determines the landscape reading area as the target reading area (S138). When it is determined that the current reading position is not the longer side position (S136: NO), which means that the current reading position is the shorter side position, the controller CR determines the portrait reading area as the target reading area (S140). It is noted that S138 and S140 are the same as S122 and S162, respectively. After execution of S138 or S140, the notification process shown in FIG. 7 is terminated.

In S142, the controller CR determines whether the user selected the reduced copy. When it is determined that the user selected the reduced copy (S142: YES), the controller CR proceeds to S144. When it is determined that the receded copy is not selected (S142: NO), that is, when it is determined that cancel is selected, the controller CR terminates the notification process shown in FIG. 7 without determining the target reading area.

In S144, the controller determines whether the current reading position is the longer side position. When it is determined that the current reading position is the longer side position (S144: YES), the controller determines an enhanced area based on the landscape reading area as the target reading area. That is, the controller CR calculates lengths of the target reading area (i.e., the enhanced area) of the longer/shorter sides as follows. Given that a length in the main scanning direction of the landscape reading area is X1, a length in the auxiliary scanning direction thereof is Y1, and the reduction ratio is 0.7 (e.g., for reducing A3 to A4), a length of the enhanced area in the main direction is obtained as X1/0.7 and a length thereof in the auxiliary scanning direction is obtained as Y1/0.7. As above, the controller CR determines the enhanced area which is defined by the calculated lengths X1/0.7 and Y1/0.7. After execution of S146, the controller CR terminates the notification process shown in FIG. 7.

When the controller CR determines that the current reading position is not the longer side position (S144: NO), that is when it is determined that the current reading position is the shorter side position, the controller CR determines an enhanced area based on the portrait reading area as the target reading area (S148). Specifically, the controller calculate lengths of the target reading area (i.e., the enhanced area) of the longer/shorter sides as follows. Given that a length in the main scanning direction of the landscape reading area is X2, a length in the auxiliary scanning direction thereof is Y2, and the reduction ratio is 0.84 (e.g., for reducing A4 to B5), a length of the enhanced area in the main direction is obtained as X2/0.84 and a length thereof in the auxiliary scanning direction is obtained as Y2/0.84. As above, the controller CR determines the enhanced area which is defined by the calculated lengths X2/0.84 and Y2/0.84. After execution of S148, the controller CR terminates the notification process shown in FIG. 7.

Next, referring to FIG. 8, the copy execution process (S200 of FIG. 3) will be described. In S210, the controller CR calculates a difference between the minimum value of the AD value of the black basic data stored in the memory ME and the minimum value of the AD value of the non-emission line data having been obtained in latest S60 or S70 (see FIG. 3).

In S212, the controller CR determines whether the difference calculated in S210 is equal to or greater than a predetermined value. When it is determined that the difference is equal to or greater than the predetermined value (S212: YES), the controller CR proceeds to S213. Otherwise (S212: NO), the controller CR skips S214-S218 and proceeds to S220.

In S214, the controller CR determines whether the cover CV is closed with respect to the main body MB. According to the embodiment, when the cover status signal obtained from the cover sensor CS (see FIG. 1C) represents the closed status of the cover CV (S214: YES), the controller CR proceeds to S216. When the cover status signal represents that the cover CV is opened (S214: NO), the controller CR skips S216 and S218, and proceeds to S220.

In S216, the controller CR executes S10-S18 (FIG. 2A) again. That is, the controller CR changes the reading position from the current position (i.e., the longer side position or the shorter side position) to the home position HP (S10), obtains the copy setting, new white reference data and black reference data (S12-S16), and stores the new reference data and new correction data in the memory ME (S18). With this operation, the controller CR is capable of executing a shading correction with use of the new correction data.

When the difference calculated in S210 is less than the predetermined value, it means that the correction data that is generated before a copy execution instruction (which triggers the copy execution process shown in FIG. 3) is given by the user is still appropriate correction data. That is, the copying machine CM is capable of executing the shading correction appropriately with use of the correction data stored in the memory ME. Because of this reason, the copying machine CM does not execute S216 and S218 which are steps for generating new correction data. As a result, the copying machine CM can executes copying quickly. However, when the difference is equal to or greater than the predetermined value (S216). Therefore, in this case (i.e., when the difference is equal to or greater than the predetermined value), with use of the new correction data, the shading correction can be performed appropriately.

When the cover CV is opened, the AD values of the non-emission line data have relatively large values (cases A1 and A2: see FIGS. 4B and 4C). It is noted that the black reference data stored in the memory ME is given under assumption that it is obtained with the cover CV being closed. As a result, the AD values have relatively small values (cf. S16 of FIG. 2). Therefore, the difference calculated in S210 is normally equal to or greater than the predetermined value (S212: YES). That is, due to the fact that a state where the black reference data is obtained and a state where the non-emission line data are obtained are different, the difference is equal to or greater than the predetermined value. Therefore, when the cover CV is opened (S214: NO), the copying machine CM does not execute S216 or S218 even if the difference is equal to or greater than the predetermined value, and prioritizes quick execution of copying.

In S220, the controller CR executes a reading process. Specifically, when the landscape reading area or the portrait reading area is determined as the target reading area (i.e., S122 and S162 of FIGS. 6, S138 and S140 of FIG. 7), the controller CR controls the movement mechanism MM to move the reading unit RU from the current reading position (i.e., the longer side position or the shorter side position) to the basic point P, and controls the reading unit RU to read the image within the target reading area in accordance with the designated reading resolution stored in the memory ME.

Further, even if the enhanced area is determined as the target reading area (S146 and S148 of FIG. 7), the controller CR firstly controls the movement mechanism MM to move the reading unit RU, without executing scanning, so that the reading position is moved from the current position (longer side position) to a particular position so that reading of the enhanced are can be executed. It is noted that, in the auxiliary scanning position, the particular position is spaced from the basic position BP by a length of the enhanced area in the auxiliary scanning direction. The controller CR controls the movement mechanism MM to move the reading unit RU so that the reading position is moved from the particular position to the basic position BP, and causes the reading unit RU to read the image within the target reading area in accordance with the designated reading resolution stored in the memory ME.

Next, the controller CR applies the shading correction to the reading result of the reading unit RU with use of the correction data stored in the memory ME. As a result, the reading data representing the read image within the target reading area from the original image formed on the original which is placed on the transparent plate TP is generated. According to the embodiment, the reading data is a multi-gradation (e.g., 256-step gradation) RGB (red, green and blue) image data.

In a modified embodiment, the controller CR may control the reading unit RU to read an entire area, in the main scanning direction, of the transparent plate TP in S220. That is, the controller CR may cause the reading unit RU to read an image of an entire area including the area of the target reading area. Then, the controller CR may generate reading data representing read image within the target reading area by removing portions outside the target reading area in the main scanning direction. Such a modification is substantially equal to a configuration where the reading unit RU is controlled to read the image within the target reading area.

In S222, the controller CR executes the printing process with use of the reading data generated in S220. According to the embodiment, when the landscape reading area or the portrait reading area is determined as the target reading area (S122, S162 of FIG. 6, S138, S140 of FIG. 7), the controller CR applies a color conversion process to the reading data, without applying a reducing process thereto, to generate CMYK (cyan, magenta, yellow and black) image data, which is multi-gradation CMYK data. Next, the controller CR applies a halftone process to the CMYK image data to generate two-step (or three-, four-step, etc.) CMYK print data. Then, the controller CR supplies the thus generated print data and the size information representing the designated sheet size obtained in S50 (FIG. 3) to the print mechanism PM. By the above operation, the controller CR is capable of causing the print mechanism PM to print the read image on the printing sheet having the designated sheet size. With the above control, the same size copying is achieved.

When the enhanced area is determined as the target reading area (e.g., S146 or S148 of FIG. 7), the controller CR applies a reducing process in accordance with the reduction ration elected by the user (e.g., 0.7 for reducing A3 size to A4 size) to generate the reduced data. Then, similarly to the above, the controller CR sequentially applies the color conversion process and the halftone process to the reduced data to generate the print data, and supplies the print data and the size information to the print mechanism PM. With this operation, the controller CR is capable of causing the print mechanism PM to print the read image on the printing sheet having the designated sheet size. As a result, the reduced copy of the read image can be achieved. After execution of S222, the process shown in FIG. 8 is terminated.

Next, referring to FIGS. 9A-13D, various cased realized by the processes shown in FIGS. 3-8 will be described. It is noted that, in each drawing, the up-down direction and right-left direction correspond to the main scanning direction and the auxiliary scanning direction, respectively. Further, in each drawing, an area where the original sheet exists is indicated by hatching.

<CASE X1: FIGS. 9A-9E>

In CASE X1, the original sheet DC is an A4 size sheet which is placed on the transparent plate TP in the landscape orientation as shown in FIG. 9A. According to the embodiment, the length of the longer side and the length of the shorter side of the A4 size sheet are LL1 and LS1, respectively. Further, the designated sheet size is the A4 size. Therefore, until the copy execution instruction is received from the user, the reading position is kept at the longer side position LP which corresponds to the length LL1 of the longer side of the A4 size sheet. When the copy execution instruction is given by the user, reading of one line of image at the longer side position LP is executed, and as the main length ML of the original sheet DC1 is executed, a length equal to the length LS of the shorter side of the normal A4 size sheet is identified (S66 of FIG. 4, S76 of FIG. 5). Therefore, the main length ML of the original sheet DC1 is determined to be shorter than the length LS1 of the shorter side of the designated sheet size (i.e., A4 size) (S120: YES). As a result, the landscape reading area corresponding to the A4 size is determined as the target reading area (S122).

As shown in FIG. 9B, in case X1A, the difference calculated in S210 (FIG. 8) is less than the predetermined value (S212: NO). Therefore, the reading position moves from the longer side position LP to the basic point BP (S220) as the reading unit RU execute reading. With this operation, as shown in FIG. 9C, within an image of the original sheet DC1, the read image R11 within the target reading area is read and the reading data is generated (S220). As a result, the read image R11 is printed on the A4 size printing sheet (S222). That is, the same size copying of the original sheet DC 1 can be executed.

As described above, when the designated sheet size is A4, the copying machine CM keeps the longer side position LP corresponding to the longer side of the A4 size as the reading position of the reading unit RU until the copy execution instruction is given by the user. Accordingly, when the copy executing instruction is given by the user, the copying machine CM can execute reading one line of image at the longer side position LP quickly. Further, when the copying machine CM is capable of identifying the main length ML of the original sheet DC1 with the reading position being the longer side position LP, and the main length ML of the original sheet DC 1 is equal to or less than the length LS1 of the shorter size of the designated sheet size, the copying machine CM determines the landscape reading area as the target reading area. As described above, according to the copying machine CM, the target reading area corresponding to the placement status of the original sheet DC1 on the transparent plate TP appropriately without a sensor in addition to the reading mechanism RM. Further, the copying machine CM controls the reading unit RU to read the target reading area by changing the reading position from the longer side position LP to the basic point BP. Because of this control, it is possible that the copying machine CM starts reading of the target reading area from the longer side position LP. Thus, it is unnecessary to change the reading position from the longer side position LP to another position when the reading operation is started. As a result, the copying machine CM can execute reading of the target reading area quickly.

Figure 8:
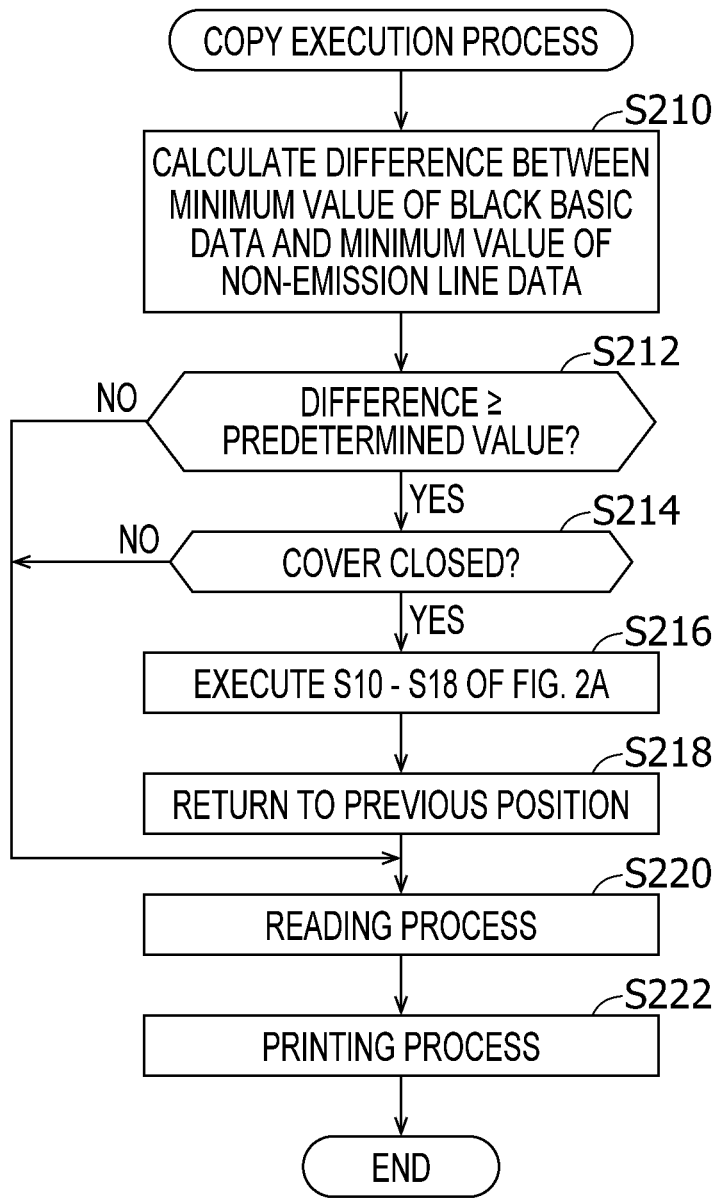
FIG. 8 is a flowchart illustrating a copy execution process according to the embodiment of the disclosures.

As shown in FIG. 9D, in case X1B, the difference calculated in S210 of FIG. 8 is equal to or greater than the predetermined value (S212: YES). Accordingly, the reading position is moved from the longer side position LP to the home position HP, and new correction data is generated (S216). Next, as shown in FIG. 9E, the reading position is returned from the home position HP to the longer side position LP (S218). Thereafter, similar to case X1A, reading of the target reading area, generation of reading data and printing on the printing sheet are executed. As described above, when the copying machine CM generates new correction data when the difference is equal to or greater than the predetermined value, the shading correction can be executed appropriately with use of the newly generated correction data.

<Case X2: FIGS. 10A-10D>

In case X2, as shown in FIG. 10A, the original sheet DC2 is an A4 size sheet in the portrait orientation. Further, the designated sheet size is the A4 size. Accordingly, when the copy executions instruction is given by the user, the reading position coincides with the longer side position LP corresponding to the length LL1 of the longer side of the A4 size sheet. However, since the original sheet DC2 does not exist at the longer side position LP, when the reading of one line is executed at the longer side position LP, the main length of the original sheet DC2 is not identified (i.e., S110: NO). Therefore, as shown in FIG. 10B, the reading position is moved from the longer side position LP to the shorter side position SP corresponding to the length LS1 of the A4 size sheet (S172). Then, reading of one line of image is executed at the shorter side position SP and a length equal to the length LL1 which is the length of the longer side of the AML 4 size sheet is identified as the main length of the original sheet DC2 (S66 of FIG. 4A or S76 of FIG. 5). Thus, it is determined that the main length ML of the original sheet DC2 is equal to or less than the length LL1 of the longer side of the designated sheet size (e.g., A4 size) (S160: YES). As a result, a portrait reading area corresponding to the A4 size sheet is determined as the target reading area (S162).

Next, as shown in FIG. 10C, the reading unit RU is moved from the shorter side position SP to the basic point BP while executing the reading operation (S220 of FIG. 8). Accordingly, as shown in FIG. 10D, reading data representing a read image RI2 which an image within the target reading area within the original image of the original sheet DC2 is generated (S220). As a result, the read image RI2 is printed on the A4 size printing sheet (S222). That is, the same size copy of the original sheet DC2 is made.

As described above, when the main length ML of the original sheet DC2 cannot be identified when the reading position is the longer side position LP, the copying machine CM moves the reading position from the longer side position LP to the shorter side position SP. When the main length ML of the original sheet DC2 is identifiable with the reading position being the shorter side position SP, and when the main length ML of the original sheet DC2 is equal to or shorter than the length LL1 of the longer side of the designated sheet size, the copying machine CM determines the portrait reading area as the target reading area. As described above, even if an additional sensor is provided besides the reading mechanism RM, the copying machine CM can appropriately determine the target reading area in accordance with the placement state (i.e., the portrait orientation) of the original sheet DC2. Further, the copying machine CM controls the reading unit RU to read the image within the target reading area with changing the reading position from the shorter side position SP to the basic point BP. Accordingly, the copying machine CM can start reading of the image within the target reading area from the shorter side position SP. That is, it is unnecessary that the copying machine CM moves the reading position from the shorter side position SP to another position before starting the reading operation. As a result, reading of the image within the target reading area can be executed quickly.

<Case Y1: FIGS. 11A-11E>

In case Y1, as shown in FIG. 11A, the original sheet DC3 is an A3 size sheet. Further, according to case Y1, the designated sheet size is the A4 size. Accordingly, when the copy execution instruction is given by the user, the reading position coincides with the longer side position LP corresponding to the length LL1 of the longer side of the A4 size. One line of reading is executed at the longer side position LP, and a length equal to the length of the shorter side of the A3 size is identified as the main length of the original sheet DC3 (S66 of FIG. 4A or S76 of FIG. 5). Therefore, it is determined that the main length ML of the original sheet DC3 is longer than the length LS1 of the shorter side of the designated sheet size (i.e., the A4 size) (S120: NO). As a result, the selection screen is displayed (S132 of FIG. 7).

As shown in FIG. 11B, the reduced copy from the A3 size to the A4 size is selected (S142: YES). As a result, the landscape reading area corresponding to the A4 size is enlarged and the enhanced area corresponding to the A3 size is determined as the target reading area (S146). Accordingly, the reading position is moved from the longer side position LP to a specific position corresponding to the enhanced area (S220 of FIG. 8).

Then, as shown in FIG. 11C, the reading position is moved from the specific position to the basic point BP with causing the reading unit RU to execute reading the image (S220). With this control, as shown in FIG. 11D, the read data representing the read image RI3 within the target reading area of the original image on the original sheet DC3 (S220). Then, as shown in FIG. 11E, a reduction process is applied to the read data representing the image of A3 size to generate the reduced data representing a reduced image RI3' corresponding to the A4 size. Then, the reduced image RI3' is printed on the A4 size printing sheet (S222). That is, the reduced copy of the read image RI3 is realized.

As above, when the main length ML of the original sheet is longer than the length LS1 of the shorter side of the designated sheet size (i.e., the A4 size in this case), the copying machine CM is capable of appropriately determining the target reading area in accordance with the user selection.

<Case Y2: FIGS. 12A-12C>

In case Y2, as shown in FIG. 12A, the original sheet DC4 is the A4 size sheet of the portrait orientation. Further, the designated sheet size is the B5 size of which the longer side has a length LL2, and the shorter side has a length LS2. When the copy execution instruction is given by the user, the reading position coincides with the longer side position LP corresponding to the length LL2 of the longer side of the B5 size. It is noted, however, the original sheet DC4 does not exist at the longer side position LP, even if one line of image is read at the longer side position LP, the main length of the original sheet DC4 cannot be identified (S110: NO). Therefore, as shown in FIG. 12B, the reading position is moved from the longer side position LP to the shorter side position SP which corresponds to the length LS2 of the shorter side of the B5 size (S172). Then, one line of image is read at the shorter side position SP, and a length equal to the length of the longer side of the A4 size is identified as the main length ML of the original sheet DC4 (S66 of FIG. 4A or S76 of FIG. 5). Therefore, the main length ML of the original sheet DC4 is determined to be longer than the length LL2 of the shorter side of the designated sheet size (i.e., the B5 size in this case) (S120: NO). As a result, the selection screen is displayed (S132 of FIG. 7).

As shown in FIG. 12C, the user selects the reduced copy for reducing the A4 size to the B5 size (S142: YES). As a result, the portrait reading area corresponding to the B5 size is enlarged and the enhanced area corresponding to the A4 size is determined as the target reading area (S148). Accordingly, the reading position is moved from the shorter side position SP to a specific position above corresponding to the enhanced area (S220).

Thereafter, process similar to case Y1 is executed (drawings therefor are omitted for brevity). That is, the reading position is moved from the specific position to the basic point BP with causing the reading unit RU to execute reading (S220).

As described above, when the main length ML of the original sheet is longer than the length LL2 of the longer side of the designated sheet size (i.e., the B5 size in this case), the copying machine CM appropriately determine the target reading area in accordance with the user's selection.

<Case Z: FIGS. 13A-13D>

Figure 13A:
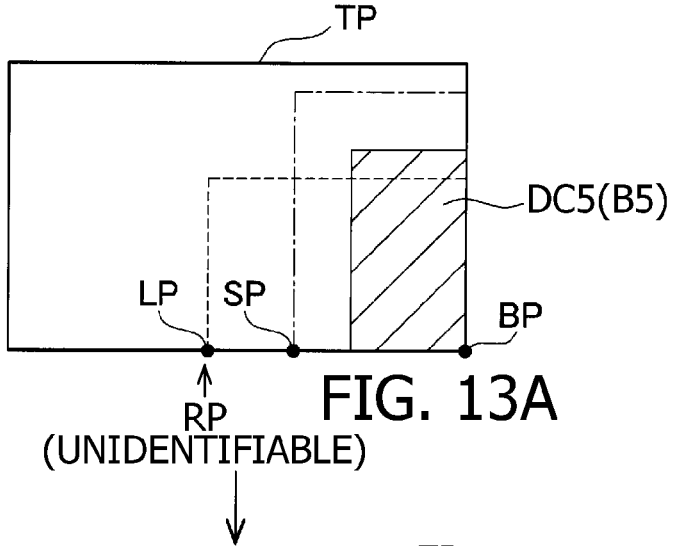
FIGS. 13A-13D show a case Z in which a designated sheet size is A4 and a B5 size original sheet is placed on the transparent plate in a portrait orientation.
Figure 13B:
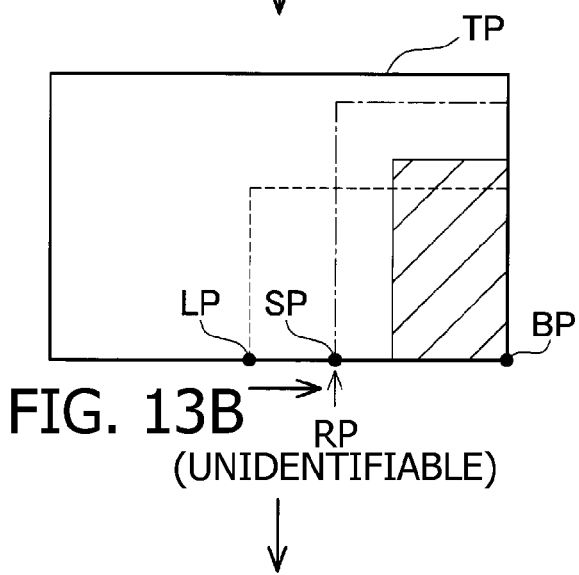

In case Z, as shown in FIG. 13A, the original sheet DC5 is a B5 size sheet, and the designated sheet size is the A4 size. Accordingly, when the copy execution instruction is received from the user, the reading position coincides with the longer side position LP corresponding to the length LL1 of the longer side of the A4 size sheet. It is note, however, the original sheet DC5 does not exist at the longer side position LP, when one line of image is read at the longer side position LP, the main length of the original sheet DC5 cannot be identified (S110: NO). Therefore, as shown in FIG. 13B, the reading position is moved from the longer side position LP to the shorter side position SP which corresponds to the length LS1 of the shorter side of the A4 size sheet (S172). Since the original sheet DC5 does not exist at the sorter side position SP either, even though one line of image is read at the shorter side position SP, the main length of the original sheet DC5 cannot be identified either (S110: NO). As a result, the portrait reading area corresponding to the A4 size is determined as the target reading area (S170: NO, S162). That is, as the target reading area, an area larger than the B5 size original sheet DC5 is determined.

Figure 13C:
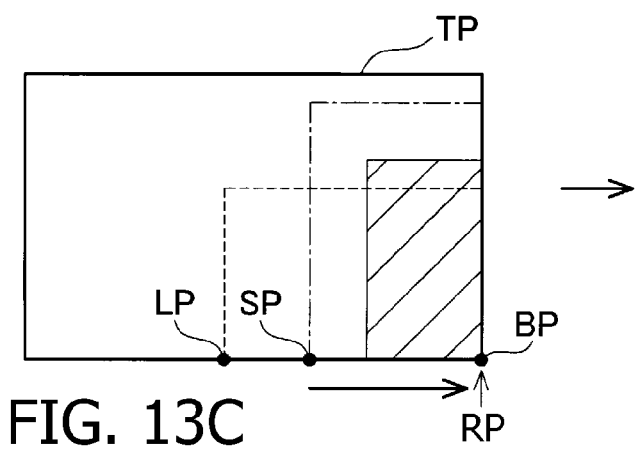
Figure 13D:
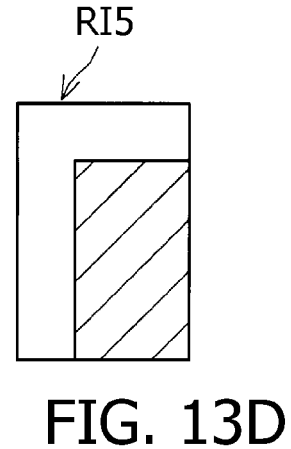

Next, as shown in FIG. 13C, the reading position is moved from the shorter side position SP to the basic point BP with causing the reading unit RU to execute reading (S220). Then, as shown in FIG. 13D, the read data representing the read image RI5 which has a larger area than the image formed on the original sheet DC5 is generated (S220). As a result, the read image RI5 is printed on the A4 size printing sheet (S222). That is, the same size copying of the original image DC5 is realized.

As described above, when the main length of the original sheet cannot be identified either at the longer side position LP or the shorter side position SP, the copying machine CM determines the portrait reading area corresponding to the designated sheet size (i.e., the A4 size in this example) as the target reading area. Since the target reading area includes an entire area of the original sheet DC5, the copying machine CM can provide the user of the printing sheet on which the entire image of the original sheet DC5 is printed. Thus, even when the main length cannot be identified, the copying machine CM can appropriately determine the target reading area.

As described with reference to case X1 (FIGS. 9A-9D), when the main length ML of the original sheet DC1 can be identified based on the result of one-line reading at the longer side position LP corresponding to the designated sheet size, the copying machine CM determines the target reading area with use of the main length ML and the designated sheet size. Further, as described with reference to case X2 (FIGS. 10A-10D), when the main length ML of the original sheet DC2 can be identified based on the result of one-line reading at the shorter side position SP corresponding to the designated sheet size, the copying machine CM can appropriately determine the target reading area with use of the main length ML and the designated sheet size.

It is noted that, in a comparative example, a pre-scanning may be employed. The pre-scanning is an operation to preliminarily scan the entire area of the transparent plate TP before actually reading the original sheet. According to such a configuration, even if a sensor other than the reading mechanism RM is not provided, the target reading area can be determined. However, according to such a configuration, the entire area of the transparent plate TP must be read, it requires longer time to determine the target reading area. In contrast, according to the above-described illustrative embodiment, it is unnecessary to read the entire area of the transparent plate TP beforehand, the target reading area can be determined quickly.

It is noted that the longer side position LP, the shorter side position SP and the home position HP are examples of a first position, a second position and a third position set forth in claims, respectively. The landscape reading area and the portrait reading area corresponding to the designated sheet size are examples of a first target area and a second target area, respectively. Steps S14 and S16 in FIG. 2A are examples of a basic data obtaining process. Step S20 of FIG. 2A and step S172 of FIG. 6 are examples of a first changing process and a second changing process, respectively.

Step S60 or S70 of FIG. 3 executed when the reading position is the longer side position LP is an example of a first line data obtaining process. Step S60 or S70 of FIG. 3 executed when the reading position is the shorter side position SP is an example of a second line data obtaining process. Steps S120 and S122 in FIG. 6, steps S138 and S146 in FIG. 7 are examples of a first determining process, and steps S160 and S162 in FIG. 6, steps S140 and S148 in FIG. 7 are examples of a second determining process.

Step S162 executed when a determination in S170 is NO (FIG. 6) is an example of a third determining process. Step S132 of FIG. 7 is an example of a displaying process. Steps S210 and S212 in FIG. 8 are examples of a determination process. An AD value used in S210 is an example of a black basic value. Step S220 in FIG. 8 is an example of a read data generating process.

It is noted that the illustrative embodiment is described in detail, but it is only an example and aspects of the disclosures should not be limited to the configurations described above. That is, aspects of the disclosures includes various modifications of the above-described illustrative embodiment. Examples of such modifications will be described below.

<Modification One>

The reading mechanism RM needs not be limited to the CIS type reading mechanism. For example, a CCD (charge coupled device) type reading mechanism may be used instead of the reading mechanism RM of the illustrative embodiment. In such a case, the reading position may be a position of a mirror instead of the position of the imaging element.

<Modification Two>

The controller CR may be configured to determine the portrait reading area as the target reading area without obtaining the line data, which is the result of reading operation of one line of the original sheet at the shorter side position SP when the main length of the original sheet cannot be determined with use of the line data that is the result of the reading operation of one line of the original sheet at the longer side position LP. That is, the second line data obtaining process, the second determining process and the third determining process may be omitted.

<Modification Three>

When it is determined that the main length of the original sheet is longer than the length of the shorter side of the designated sheet size (S120: NO), the controller CR may be configured to execute the reduced copying without executing the notification process in S130. In such a case, the controller CR may calculate the reduction ratio by dividing the length of the designated sheet size by the main length of the original sheet, and determine the enhanced area which is defined by enlarging the landscape reading area based on the calculated reduction ratio as the target reading area.

Further, when the main length of the original sheet is longer than the length of the longer side of the designated sheet size (S160: NO), the controller CR may automatically execute the reduction copying without executing the notification process in S130. In such a case, for example, the controller CR may calculate the reduction ratio by dividing the length of the longer side of the designated sheet size by the main length of the original sheet, and determine the enhanced area which is defined by enlarging the portrait reading area based on the calculated reduction ratio as the target reading area. That is, in the above cases, the displaying process may be omitted.

<Modification Four>

Then controller CR may not change the reading position to the longer side position LP unless the copy execution instruction is received from the user. For example, the controller CR may keep the reading position at the home position HP, and change the reading position from the home position HP to the longer side position LP in response to receipt of the copy execution instruction from the user. Thereafter, the controller CR may execute the process shown in FIG. 3. In general, the controller need not execute the first modification process every time the designated sheet size in the memory is changed.

<Modification Five>

In FIGS. 4A-4C and FIG. 5, the controller CR may obtain only the light-emitting time line data and may not obtain the non-emission line data. In such a case, the controller CR may identify a length of a portion exhibiting relatively large AD values from among the light-emitting time line data as the main length of the original sheet. Alternatively, in FIGS. 4A-4C, the controller CR may obtain only the non-emission line data and may not obtain the light-emitting time line data. In such a case, the controller CR may identify a length of a portion exhibiting relative small AD values as the main length of the original sheet. In general, it is sufficient that the first line data may include at least one of the light-emitting time line data and the non-emission line data. Similarly, it is sufficient that the second line data may include at least one of the light-emitting time line data and non-emission line data.

<Modification Six>

In S210 of FIG. 8, the controller CR may calculate an average value of the AD values of the black basic data instead of calculating the minimum value of the AD values of the black basic data. Further, the controller CR may calculate the average value of the AD values of the non-emission line data instead of calculating the minimum value of the AD values of the non-mission lined data. Then, in S212, the controller CR may determine whether the difference between the two average values above is equal to or greater than a predetermined value. According to this modification, the average value is an example of the black basic value.

<Modification Seven>

In the copy execution process in FIG. 8, the controller CR may omit steps S210-S218 and executes S220 and S222. That is, the determining process may be omitted.

<Modification Eight>

In the above-described illustrative embodiment, the home position HP is defined at an end portion of one end side (e.g., left-hand side FIG. 1B) in the auxiliary scanning direction, and the basic point BP is defined at an end of the other side (e.g., right-hand side in FIG. 1B). It is noted that the home position HP and the basic point BP may be provided on the end portion on the same side portion in the auxiliary scanning direction.

<Further Modifications>

The disclosures further suggest following modified configurations.

According to a first modified configuration, the controller CR may change the reading position to an intermediate position (hereinafter, referred to as a first intermediate position) between the longer side position LP and the shorter side position SP. In such a case, the controller CR may obtain one line of reading result (i.e., one line of image) when the reading position is at the first intermediate position. Then, the controller CR may determine the target reading area with use of the main length of the original sheet obtained from the one line of reading result and the designated sheet size (S112 of FIG. 6: YES, S120, S112).

According to a second modified configuration, the controller CR may change the reading position to the shorter side position SP in S20 (FIG. 2A). In such a case, the controller CR may obtain one line of reading result when the reading position is at the shorter side position SP. Then, when the main length of the original sheet obtained from the one line of reading result is shorter than the length of the shorter side of the designated sheet size, the controller CR may determine the landscape reading area as the target reading area, while when the main length of the original sheet is longer than the length of the shorter side of the designated sheet size, the controller CR may determine the portrait reading area as the target reading area.

According to a third modified configuration, the controller CR may change the reading position to an intermediate position (hereinafter, referred to as a second intermediate position) between the shorter side position SP and the basic point BP. In such a case, the controller CR may determine the target reading area similarly to the second modified configuration described above. In general, according to the third modified configuration, the first position may not be a position at which the distance between the reading position and the basic point corresponds to the length of the longer side of the designated sheet size, but may be any position at which a distance between the reading position and the basic point is equal to or less than the length of the designated sheet size.

That is, the first position may be anyone of the longer side position LP, the first intermediate position described above, the shorter side position SP and the second intermediate position described above. According to the third modified configuration, the copying machine CM can appropriately determine the target reading area with use of the main length of the original sheet and the designated sheet size without additional sensor besides the reading mechanism.

It is noted that various elements described in the disclosures and drawings provide with technical usefulness individually or in suitable combinations, and should not be limited to the configurations set forth in the combinations of the claims. Further, the technical teachings set forth in the disclosures and the drawings may realize a plurality of objects, and such technical teachings have technical usefulness at least one of the objects is realized.

What is claimed is:

1. A copying machine, comprising:
an original sheet placement table on which a basic point is defined, one of vertexes of an original sheet subject to reading being to be arranged at the basic point;
a reading mechanism configured to read an image on the original sheet placed on the original sheet placement table, the reading mechanism reading the image on a line basis, the line extending in a main scanning direction by changing a reading position in an auxiliary direction which is perpendicular to the main scanning direction; and
a memory configured to store a designated sheet size which is one of a plurality of types of sheet sizes and designated by a user;
a print mechanism configured to print an image on a printing sheet, of which size is the designated sheet size stored in the memory, based on a result of reading executed by the reading mechanism; and
a controller,
the controller being configured to execute:

a first changing process in which the controller changes the reading position to a first position which corresponds to the designated sheet size without causing the reading mechanism to execute reading, the first position being a position at which the reading position is spaced, in the auxiliary scanning direction, from the basic point by a length corresponding to a length of a longer side of the designated sheet size;

a first line data obtaining process in which the controller obtains first line data corresponding to a length of a longer side of the designated sheet size by causing the reading mechanism to read one line of image along the main scanning direction when the reading position is the first position;

a first determining process in which the controller determines the target reading area on the original sheet placement table with use of the main length of the original sheet and the designated sheet size when the main length of the original sheet is identifiable with use of the first line data, the target reading area having a rectangular shape, one of vertexes of the rectangular shape being the basic point; and a read data generating process in which the controller generates read data representing a read image within the target reading area of an original image formed on the original sheet by causing the reading mechanism to read the image within the target reading area.

2. The copying machine according to claim 1,
wherein, in the first determining process:
the controller determines whether or not the main length of the original sheet is equal to or less than the length of the shorter side of the designated sheet size when the main length of the original sheet is identifiable with use of the first line data:
the controller determines a first target area as the target reading area when it is determined that the main length of the original sheet is equal to or less than the length of the shorter side of the designated sheet size,
wherein the first target area has a length, in the main scanning direction, corresponding to the length of the shorter side of the designated sheet size, and a length, in the auxiliary scanning direction, corresponding to the length of the longer side of the designated sheet size, and
wherein, in the read data generating process:
when the first target area is determined as the target reading area, the controller causes the reading mechanism to read an image within the first target area, which is the target reading area, with changing the reading position of the reading mechanism from the first position to the basic point.

3. The copying machine according to claim 2,
further comprising a display mechanism,
wherein the controller is configured to execute a displaying process when it is determined in the first determining process that the main length of the original sheet is longer than the length of the shorter side of the designated sheet size, the displaying process being a process in which the controller displays a selection screen encouraging the user to select a copying ratio on the display mechanism,
wherein, in the first determining process:
the controller determines the first target area as the target reading area when the user selects a same size copying through the selection screen; and the controller determines a first enhanced area which is an area defined by enlarging the first target area based on the copying ratio selected by the user as the target reading area.

4. The copying machine according to claim 1,
wherein the controller is configured to execute:
a second changing process in which the controller moves the reading mechanism to change the reading position from the first position to a second position corresponding to the designated sheet size when the main length of the original sheet cannot be identified with use of the first line data, the second position being a position at which a distance, in the auxiliary scanning direction, between the basic point and the reading position corresponds to the length of the shorter size of the designated sheet size;

a second line data obtaining process in which the controller obtains second line data by causing the reading mechanism to read one line of image along the main scanning direction when the reading position of the reading mechanism is located at the second position; and a second determining process in which the controller determines the target reading area within the original sheet placement table with use of the main length of the original sheet and the designated sheet size when the main length of the original sheet is identifiable with use of the second line data.

5. The copying machine according to claim 4,
wherein, in the second determining process:
the controller determines whether or not the main length of the original sheet is equal to or less than the length of the longer side of the designated sheet size when the main length of the original sheet is identifiable with use of the second line data:
the controller determines a second target area as the target reading area when it is determined that the main length of the original sheet is equal to or less than the length of the longer side of the designated sheet size,
wherein the second target area has a length, in the main scanning direction, corresponding to the length of the longer side of the designated sheet size, and a length, in the auxiliary scanning direction, corresponding to the length of the shorter side of the designated sheet size, and
wherein, in the read data generating process:
when the second target area is determined as the target reading area, the controller causes the reading mechanism to read an image within the second target area, which is the target reading area, with changing the reading position of the reading mechanism from the second position to the basic point.

6. The copying machine according to claim 5,
further comprising a display mechanism,
wherein the controller is configured to execute a displaying process when it is determined in the second determining process that the main length of the original sheet is longer than the length of the longer side of the designated sheet size, the displaying process being a process in which the controller displays a selection screen encouraging the user to select a copying ratio on the display mechanism,
wherein, in the second determining process:
the controller determines the second target area as the target reading area when the user selects a same size copying through the selection screen; and the controller determines a second enhanced area which is an area defined by enlarging the second target area based on the copying ratio selected by the user as the target reading area.

7. The copying machine according to claim 4,
wherein the controller is further configured to execute a third determining process in which the controller determines a second target area as the target reading area when the main length of the original sheet cannot be identified with use of the second line data, and
wherein the second target area has a length, in the mail scanning direction, corresponding to the length of the longer side of the designated sheet size, and a length, in the main scanning direction, corresponding to the shorter side of the designated sheet size.

8. The copying machine according to claim 1,
wherein the controller is further configured to execute:
the first changing process in which, every time when the designated sheet size is changed, the controller changes the reading position of the reading mechanism which is not execute reading to the firs position corresponding to the designated sheet size after the designated sheet size is changed; and
the first line data obtaining process, when the copy execution instruction is to be received from the user, with use of the reading mechanism which keeps staying at the first position as the reading position from execution of the first changing process to receipt of the copy execution instruction from the user.

9. The copying machine according to claim 1,
wherein, in the first line data obtaining process:
the controller obtains light-emitting time line data by causing a light source of the reading mechanism to emit light when the reading position is the first position and causing the reading mechanism to read one line of image along the main scanning direction; and
the controller obtains non-emission time line data by causing the light source of the reading mechanism not to emit light when the reading position is at the first position and causing the reading mechanism to read one line of image along the main scanning direction,
the first line data including the light-emitting time line data and the non-emission time line data.

10. The copying machine according to claim 9,
further comprising a white basic member secured to the original sheet placement table, and
wherein the controller is further configure to execute:
a basic data obtaining process in which:
every time when the designated sheet size stored in the memory is changed,
the controller obtains white basic data by causing the light source of the reading mechanism to emit light and causing the reading mechanism to execute reading the white basic member,
the controller obtains black basic data by causing the light source of the reading mechanism and causing the reading mechanism to execute reading an image, and
the controller stores the white basic data and the black basic data in the memory;
a determining process in which, when the target reading area has been determined in the first determining process, the controller determines whether or not a difference between a black basic value obtained from the non-emission time line data and another black basic value obtained from the black basic data currently stored in the memory is equal to or greater than a predetermined value, wherein the controller is further configured such that:
when it is determined that the difference is equal to or greater than the predetermined value,
the controller re-executes the basic data obtaining process by changing the reading position of the reading mechanism from the first position to a predetermined position at which the white basic member is readable before execution of the read data generating process; and
the controller executes the read data generating process by changing the reading position from the predetermined position to the first position after execution of the basic data obtaining process,
when it is determined that the difference is less than the predetermined value
the controller executes the read data generating process without re-executing the basic data obtaining process.

11. The copying machine according to claim 10,
wherein the basic point is provided at one end portion, in the auxiliary scanning direction, of the original sheet placement table, and
wherein the white basic member is provided to another end portion, in the auxiliary scanning direction, of the original sheet placement table.

12. A computer-readable medium encoded with computer-executable instructions to be executed by a copying machine, the copying machine having:
an original sheet placement table on which a basic point is defined, one of vertexes of an original sheet subject to reading being to be arranged at the basic point;
a reading mechanism configured to read an image on the original sheet placed on the original sheet placement table, the reading mechanism reading the image on a line basis, the line extending in a main scanning direction by changing a reading position in an auxiliary direction which is perpendicular to the main scanning direction; and
a memory configured to store a designated sheet size which is one of a plurality of types of sheet sizes and designated by a user;
a print mechanism configured to print an image on a printing sheet, of which size is the designated sheet size stored in the memory, based on a result of reading executed by the reading mechanism; and
a controller,
the instructions cause, when executed, the controller to perform:
a first changing process in which the controller changes the reading position to a first position which corresponds to the designated sheet size without causing the reading mechanism to execute reading, the first position being a position at which the reading position is spaced, in the auxiliary scanning direction, from the basic point by a length corresponding to a length of a longer side of the designated sheet size;
a first line data obtaining process in which the controller obtains first line data corresponding to a length of a longer side of the designated sheet size by causing the reading mechanism to read one line of image along the main scanning direction when the reading position is the first position;
a first determining process in which the controller determines the target reading area on the original sheet placement table with use of the main length of the original sheet and the designated sheet size when the main length of the original sheet is identifiable with use of the first line data, the target reading area having a rectangular shape, one of vertexes of the rectangular shape being the basic point; and a read data generating process in which the controller generates read data representing a read image within the target reading area of an original image formed on the original sheet by causing the reading mechanism to read the image within the target reading area.

13. A copying area detecting method to be executed by a copying machine, the copying machine having:

an original sheet placement table on which a basic point is defined, one of vertexes of an original sheet subject to reading being to be arranged at the basic point;

a reading mechanism configured to read an image on the original sheet placed on the original sheet placement table, the reading mechanism reading the image on a line basis, the line extending in a main scanning direction by changing a reading position in an auxiliary direction which is perpendicular to the main scanning direction; and a memory configured to store a designated sheet size which is one of a plurality of types of sheet sizes and designated by a user;

a print mechanism configured to print an image on a printing sheet, of which size is the designated sheet size stored in the memory, based on a result of reading executed by the reading mechanism; and a controller, the method executes:

a first changing process in which the controller changes the reading position to a first position which corresponds to the designated sheet size without causing the reading mechanism to execute reading, the first position being a position at which the reading position is spaced, in the auxiliary scanning direction, from the basic point by a length corresponding to a length of a longer side of the designated sheet size;

a first line data obtaining process in which the controller obtains first line data corresponding to a length of a longer side of the designated sheet size by causing the reading mechanism to read one line of image along the main scanning direction when the reading position is the first position;

a first determining process in which the controller determines the target reading area on the original sheet placement table with use of the main length of the original sheet and the designated sheet size when the main length of the original sheet is identifiable with use of the first line data, the target reading area having a rectangular shape, one of vertexes of the rectangular shape being the basic point; and a read data generating process in which the controller generates read data representing a read image within the target reading area of an original image formed on the original sheet by causing the reading mechanism to read the image within the target reading area.

* * * * *